(12) United States Patent
Brunner

(10) Patent No.: US 7,760,833 B1
(45) Date of Patent: Jul. 20, 2010

(54) QUADRATURE DEMODULATION WITH PHASE SHIFT

(75) Inventor: Eberhard Brunner, Portland, OR (US)

(73) Assignee: Analog Devices, Inc., Norwood, MA (US)

( * ) Notice: Subject to any disclaimer, the term of this patent is extended or adjusted under 35 U.S.C. 154(b) by 1485 days.

(21) Appl. No.: 11/061,366

(22) Filed: Feb. 17, 2005

(51) Int. Cl.
*H04L 7/00* (2006.01)
*H03D 3/10* (2006.01)
*H04L 27/00* (2006.01)
*H04L 23/02* (2006.01)

(52) U.S. Cl. .................. 375/354; 375/327; 375/324; 375/355; 375/265

(58) Field of Classification Search .............. 375/261, 375/326–329, 148, 354, 327, 324, 355, 365; 329/336, 304
See application file for complete search history.

(56) References Cited

U.S. PATENT DOCUMENTS

| | | | | |
|---|---|---|---|---|
| 4,155,258 A | | 5/1979 | Engeler et al. | |
| 4,598,589 A | * | 7/1986 | Riley et al. | 73/609 |
| 4,628,272 A | * | 12/1986 | Davis et al. | 329/336 |
| 4,796,188 A | * | 1/1989 | Gale et al. | 701/200 |
| 4,875,050 A | * | 10/1989 | Rathi | 342/195 |
| 5,301,210 A | * | 4/1994 | Vandamme et al. | 375/329 |
| 5,488,588 A | * | 1/1996 | Engeler et al. | 367/7 |
| 5,555,534 A | * | 9/1996 | Maslak et al. | 367/135 |
| 5,878,088 A | * | 3/1999 | Knutson et al. | 375/324 |
| 5,963,582 A | * | 10/1999 | Stansell, Jr. | 375/148 |
| 5,963,597 A | * | 10/1999 | Okawa | 375/261 |
| 6,038,267 A | * | 3/2000 | Oura et al. | 375/329 |
| 6,088,402 A | * | 7/2000 | White | 375/326 |
| 6,100,755 A | * | 8/2000 | Ishii | 329/304 |
| 6,201,841 B1 | * | 3/2001 | Iwamatsu et al. | 375/346 |
| 6,392,500 B1 | * | 5/2002 | McCallister et al. | 332/103 |
| 6,463,266 B1 | * | 10/2002 | Shohara | 455/196.1 |
| 6,665,353 B1 | * | 12/2003 | Nisbet | 375/302 |
| 6,808,494 B2 | | 10/2004 | Shifrin | |
| 2004/0208263 A1 | * | 10/2004 | Rives et al. | 375/327 |

(Continued)

FOREIGN PATENT DOCUMENTS

GB    EP 0143 539    *  5/1985

(Continued)

OTHER PUBLICATIONS van Lammeren, Joop P.M. et al., "Mixed-signal quadrature demodulator with a multi-carrier regeneration system", 1999, IEEE Custom Integrated Circuits Conference, pp. 209-212, vol. 35, Issue 3.*

(Continued)

*Primary Examiner*—Mohammad H Ghayour
*Assistant Examiner*—Sarah Hassan
(74) *Attorney, Agent, or Firm*—Marger Johnson & McCollom, PC

(57) ABSTRACT

A quadrature demodulator preweights an input signal prior to mixing with in-phase and quadrature clock signals. In an implementation with discrete phase rotation, a series of weighting circuits may be arranged before or after a select circuit to select the amount of phase rotation. Various implementations may include ratioed current mirrors to perform the weighting function, a stacked arrangement of mixers, an H-bridge input stage, integrated mixers and select circuits, and/or selectable gain stages such as gm cells to perform the weighting function.

1 Claim, 21 Drawing Sheets

U.S. PATENT DOCUMENTS

| | | | |
|---|---|---|---|
| 2004/0218705 A1* | 11/2004 | Cranford et al. | 375/355 |
| 2005/0001765 A1* | 1/2005 | Ryu et al. | 342/377 |
| 2005/0033168 A1 | 2/2005 | Shifrin | |
| 2005/0093591 A1* | 5/2005 | Rhee et al. | 327/156 |
| 2005/0220205 A1* | 10/2005 | Kang et al. | 375/265 |

FOREIGN PATENT DOCUMENTS

JP      EP 0186757 A2 * 9/1986

OTHER PUBLICATIONS

Langlois, J.M.P. et al., "A High Performance, Wide Bandwidth, Low Cost FPGA-Based Quadrature Demodulator", IEEE Canadian Conference on Electrical and Computer Engineering, vol. 1, May 9-12, 1999 pp. 497-502 vol. 1.*

S.A. Hovanessian, *Radar System Design and Analysis*, pp. 264-268, 1984.

David H. Evans and W. Norman McDicken, *Doppler Ultrasound—Physics, Instrumentation and Signal Processing*, Second Edition, 1989 and 2000, pp. 100-105.

PCT Application, International Application No. PCT/US95/09900, Aug. 4, 1995.

John Wiley & Sons, Ltd., David H. Evans and W. Norman McDicken, Doppler Ultrasound: Physics, Instrumentation and Signal Processing, pp. 100-105 (Section 6.2.5), 2000, West Sussex, England.

* cited by examiner

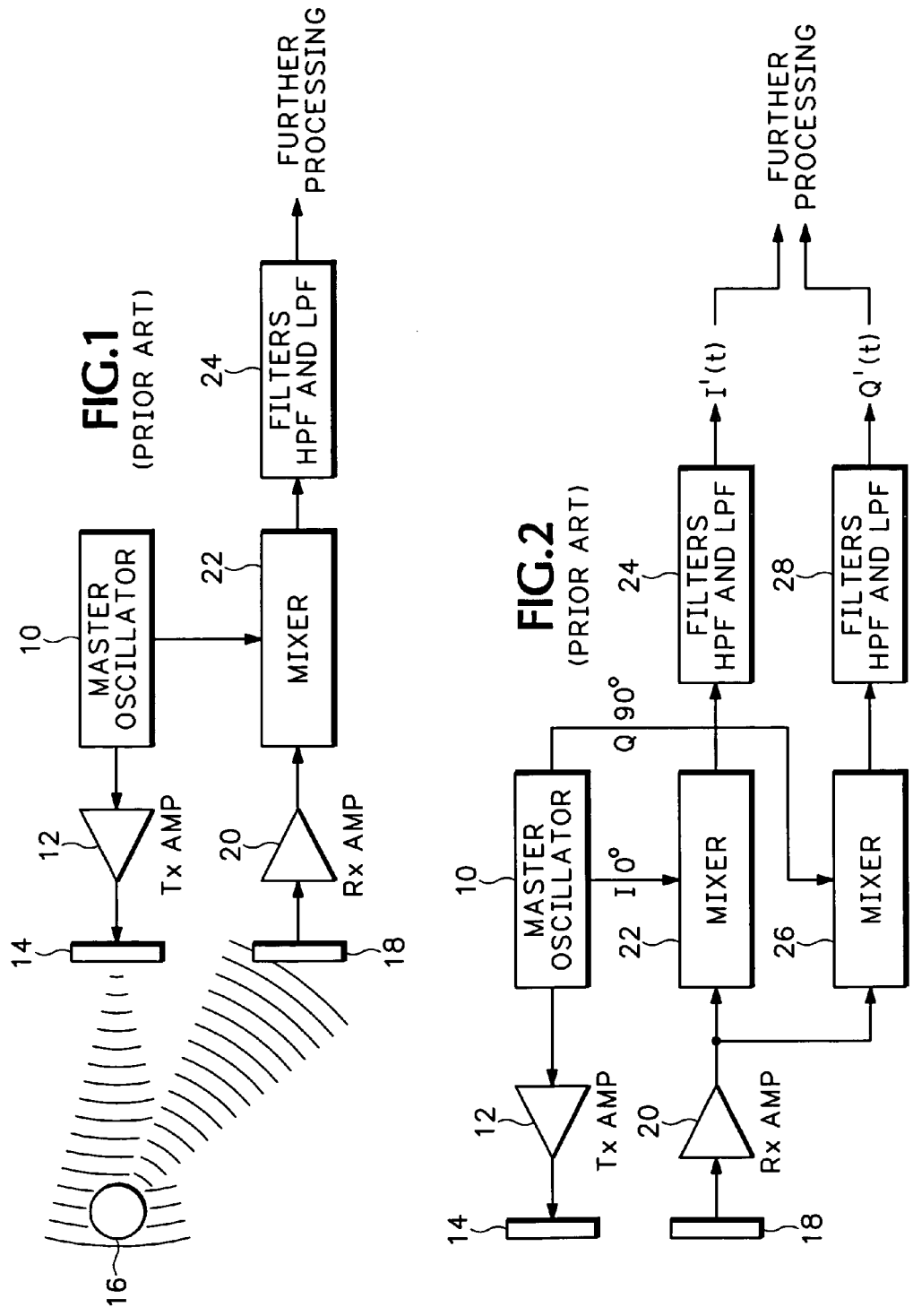

FIG.6 $\hat{C}=-\hat{C}$

QUADRATURE DEMODULATION WITH PHASE SHIFT

BACKGROUND

The Doppler effect is widely used in monitoring systems to measure the speed of moving objects. Some examples include measurement of blood flow with medical ultrasound equipment and determination of aircraft movement with radar. The Doppler effect causes the frequency of a wave reflected from a moving object to shift relative to the frequency of the wave directed at the object. The amount of frequency shift is determined by the speed of the object.

FIG. 1 illustrates a basic system for measuring Doppler frequency shift. A master oscillator 10 generates a reference frequency signal that is amplified by transmit (Tx) amplifier 12 to generate an electrical signal that drives a transmit element 14. The transmit element emits waves that are reflected by an object of interest 16 and return to a receive (Rx) element 18 where they are converted to electrical signals. A receive amplifier 20 boosts the power of the Rx signal which is then demodulated by a mixer 22 that mixes the Rx signal with a reference signal derived from the master oscillator. A filter stage 24 having high-pass and low-pass filters (HPF and LPF) removes unwanted components from the demodulated signal before further processing, typically by a digital signal processing system.

The transmit and receive elements are often mounted together in a single transducer. In a radar system, the transmit element may be embodied as an antenna which converts the electrical signals into electromagnetic waves. The receive element then converts the reflected electromagnetic waves back into electrical signals. In an ultrasound system, the transmit and receive elements may be realized as crystals which convert electrical signals into sound waves and vice versa.

The system of FIG. 1 is known as a coherent demodulation system because the reference signal for the demodulator is derived from the same master oscillator used to generate the transmit signal. It is a non-directional system because it cannot distinguish between motion towards the transducer and motion away from the transducer. It can only determine the magnitude (speed) of the motion. This is because motion of the object towards and away from the transducer create upper and lower Doppler sidebands in the carrier frequency spectrum which are then shifted into the same region of the baseband output from the demodulator. The Rx signal may be expressed as follows:

$$S(t) = \underbrace{A_0\cos(\omega_0 t + \phi_0)}_{Carrier} + \underbrace{A_f\cos(\omega_0 t + \omega_f t + \phi_f)}_{Forward} + \underbrace{A_r\cos(\omega_0 t - \omega_r t + \phi_r)}_{Reverse} \quad \text{Eq. 1}$$

where A, ω, and φ represent the amplitude, angular frequency and phase of each signal component, and the subscripts 0, f, and r signify the carrier, forward (toward the transducer probe), and reverse (away from the probe) components. The system of FIG. 1 is unable to distinguish between the forward and reverse sidebands.

To determine the direction in which the object is moving (i.e., towards or away from the transceiver), a more sophisticated demodulation technique is required. Some examples of directional demodulation techniques include single sideband demodulation (SSB), heterodyne demodulation, and quadrature demodulation.

FIG. 2 illustrates a basic Doppler measurement system that utilizes quadrature demodulation to obtain directional information on the movement of an object. The system of FIG. 2 is similar to that of FIG. 1, but the demodulator includes two mixers 22 and 26 which mix the Rx signal with an in-phase ("I") clock signal from the master oscillator, and a quadrature ("Q") clock signal that is phase shifted (90 degrees) from the I clock signal. Thus, a quadrature demodulator is also referred to as an I/Q demodulator.

After high-pass and low-pass filtering in filter stages 24 and 28, the demodulated signals I'(t) and Q'(t) contain only the Doppler components:

$$I'(t) = \frac{1}{2}A_f\cos(\omega_f t + \phi_f) + \frac{1}{2}A_r\cos(\omega_r t + \phi_r) \quad \text{Eq. 2}$$

$$Q'(t) = -\frac{1}{2}A_f\sin(\omega_f t + \phi_f) + \frac{1}{2}A_r\sin(\omega_r t + \phi_r) \quad \text{Eq. 3}$$

Further processing extracts the forward and reverse components from the I'(t) and Q'(t) signals.

Transducers having multiple transmit and/or receive elements may be used to improve the basic performance of a Doppler measurement system, or to provide additional functionality. For example, multiple element transmitters and receivers may be used to implement beamforming techniques in which the maximum transmit and receive strength of the transducer are pointed in the direction of the object to be measured. The elements are arranged in an array that is scanned by a beamforming network so that the signal to or from each element is phase (or time) shifted relative to the other elements. In the transmit path, a beamforming network shifts the transmit signal by different phase amounts as it distributes the signal to the different elements in the scanning process. In the receive path, a beamforming network shifts the receive signals by different amounts as the array is scanned so the signals from the individual elements can be phase (or time) aligned and then combined (summed) to form a single receive signal. The summed signal level theoretically thereby increases by N where N is the number of array elements. If noise is uncorrelated, it increases by $\sqrt{N}$, thereby increasing the summed signal-to-noise ratio (SNR) by $N/\sqrt{N}=\sqrt{N}$.

FIG. 3 illustrates the basic principle of using an array of elements for beamforming. In this example, which is generic to both transmit and receive scanning, the signals for array elements $A_1$ through $A_N$ are shown shifted by various amounts relative to time t=0. The amount each signal is shifted during the scanning process determines the angle θ of the beam. Numerous scanning techniques have been developed including time-delay scanning and phase scanning; if done in the analog domain, it is called analog beamforming, if done in the digital domain it is called digital beamforming (DBF). There are two general ways to beamform. One is to align and sum the signals at the RF frequency as shown in FIG. 4. The other is at baseband, in which case each channel requires downconversion and filtering before summation.

FIG. 4 illustrates a beamforming system for time-delay scanning an array of receive elements in an ultrasound system that utilizes RF summation followed by quadrature demodulation. The receiver array 30 includes multiple receive crystals $A_1$ through $A_N$ (where N is typically a power of 2) which convert the received ultrasound waves into electrical signals that are amplified by low noise amplifiers (LNAs) 34. The outputs from the LNAs are converted to current-mode signals by V-I converters 36. A multiplexer array 38 selectively connects the current-mode signals to the input taps of a delay line circuit 40. The delay line circuit imparts a different time delay to each input signal depending on which input tap it is applied to. All of the delayed input signals are then summed at node N1 to produce a composite receive signal which is then quadrature demodulated by multipliers 42 and 44 in response to the I clock signal $\cos(\omega_0 t)$ and the Q clock signal $\sin(\omega_0 t)$. The resulting signals are then band-pass filtered and converted to digital form for further processing.

Although the system of FIG. 4 may provide effective beamforming and demodulation, it generally requires a very high performance demodulator which drives up the system power and cost. Also, since delay line circuits are generally cumbersome to add to each individual receive element, the system includes multiplexer array 38 to allow the use of a single delay line circuit where the currents are routed to the appropriate tap to insure coherent addition at node N1. In a DBF system, a separate memory for each channel functions as the "delay line". Selecting the appropriate memory locations allows multiple beams to be formed at the same time. However, continuous wave (CW) Doppler signals tend to have dynamic ranges that are too large to be processed by a DBF system. In addition, multiplexer arrays tend to require extensive space on an integrated circuit.

FIG. 5 illustrates a beamforming system for phase scanning an array of receive elements in an ultrasound system that utilizes quadrature demodulation. The system of FIG. 5 includes an array of receive crystals $A_1$ through $A_N$ and low noise amplifiers (LNAs) 34. The output from each LNA is demodulated by an I mixer 46 and a Q mixer 48 in response to I and Q clock signals (which are not shown here for simplicity). Phase rotators 50 and 52 are placed in series after the mixers to phase shift the $I_{1...N}$ and $Q_{1...N}$ signals in response to the phase select signals $\Phi_1$ through $\Phi_N$. The $I_{1...N}$ and $Q_{1...N}$ outputs are summed to generate I(t) and Q(t) which may then be converted to voltage mode signals, band-pass filtered, etc.

Although the system of FIG. 5 requires a complete demodulator for each receiver, each of the demodulators is generally subject to less demanding criteria than the demodulator required for the system in FIG. 4 since they are located before beamformation. Another salient feature is that the phase rotation is performed at baseband which is generally less demanding than operations performed at the full RF frequencies of the input signals. The system in FIG. 5 is expected to require less circuit board space than the system of FIG. 4.

BRIEF DESCRIPTION OF THE DRAWINGS

FIG. 1 illustrates a prior art system for measuring Doppler frequency shift.

FIG. 2 illustrates a prior art Doppler measurement system that utilizes quadrature demodulation to obtain directional information on the movement of an object.

DETAILED DESCRIPTION

This patent disclosure includes numerous inventions relating to phase shift in demodulator systems. These inventive principles have independent utility and are independently patentable. In some cases, additional benefits are realized when some of the principles are utilized in various combinations with one another, thus giving rise to yet more patentable inventions. These principles may be realized in countless different embodiments. Although some specific details are shown for purposes of illustrating the preferred embodiments, other effective arrangements can be devised in accordance with the inventive principles of this patent disclosure.

Figure 3:
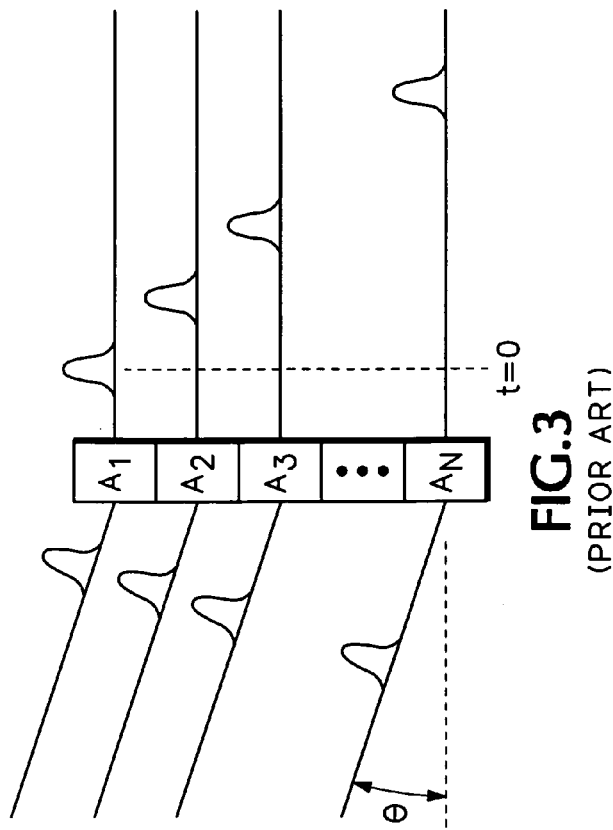
FIG. 3 illustrates the basic principle of using an array of elements for beamforming.
Figure 4:
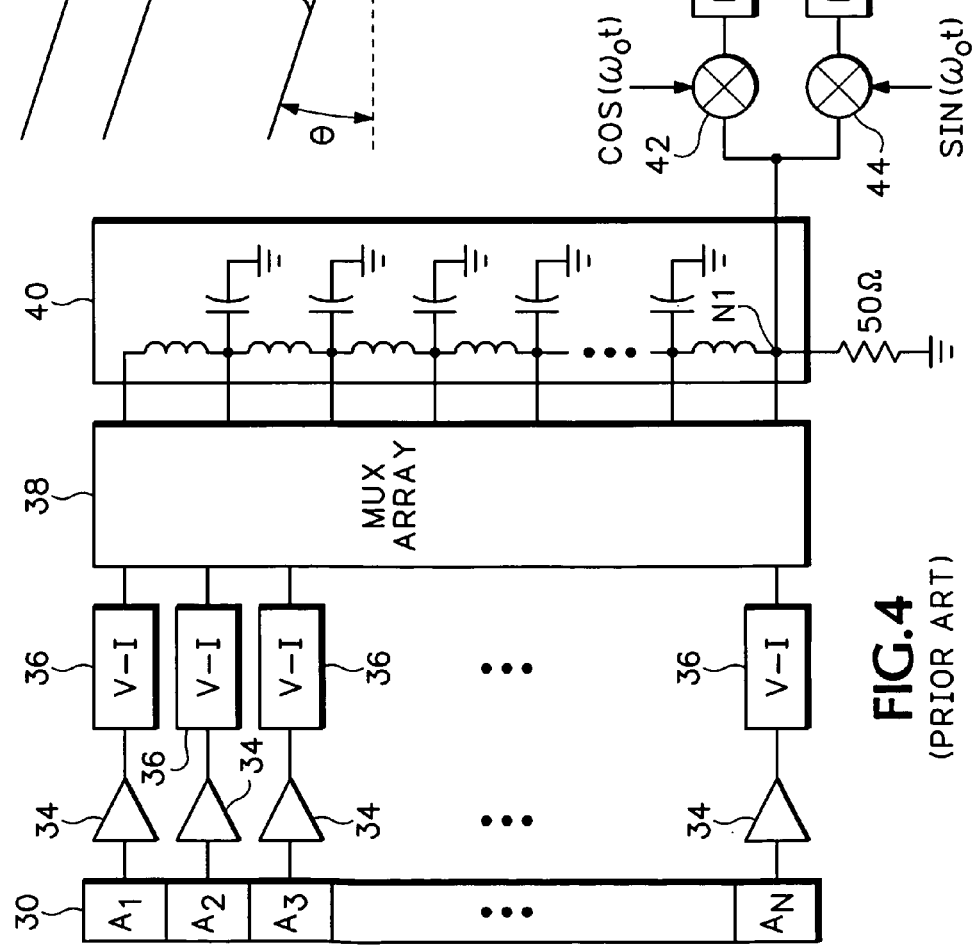
FIG. 4 illustrates a prior art beamforming system with time-delay scanning and quadrature demodulation.
Figure 5:
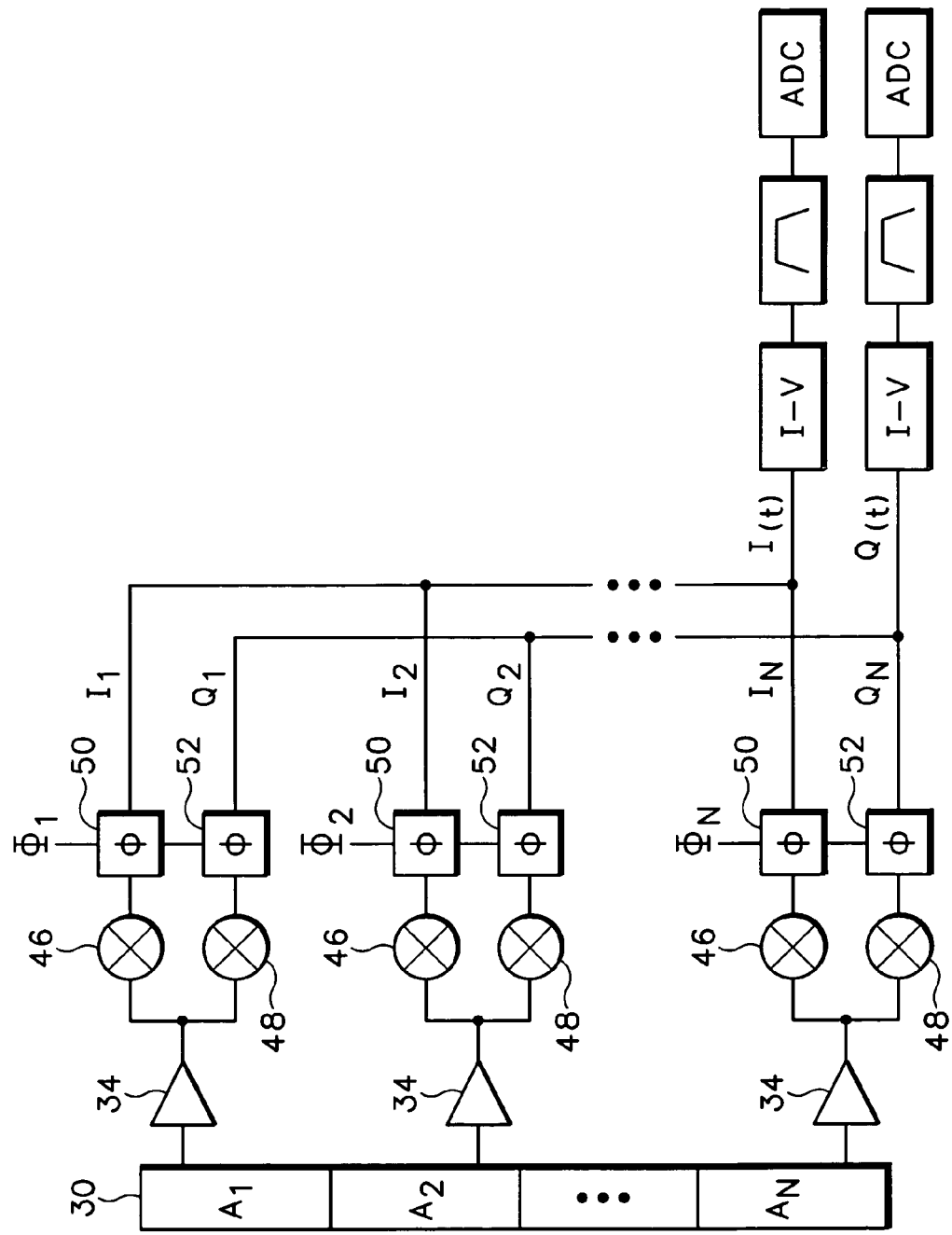
FIG. 5 illustrates a prior art beamforming system with phase scanning and quadrature demodulation.
Figure 6:
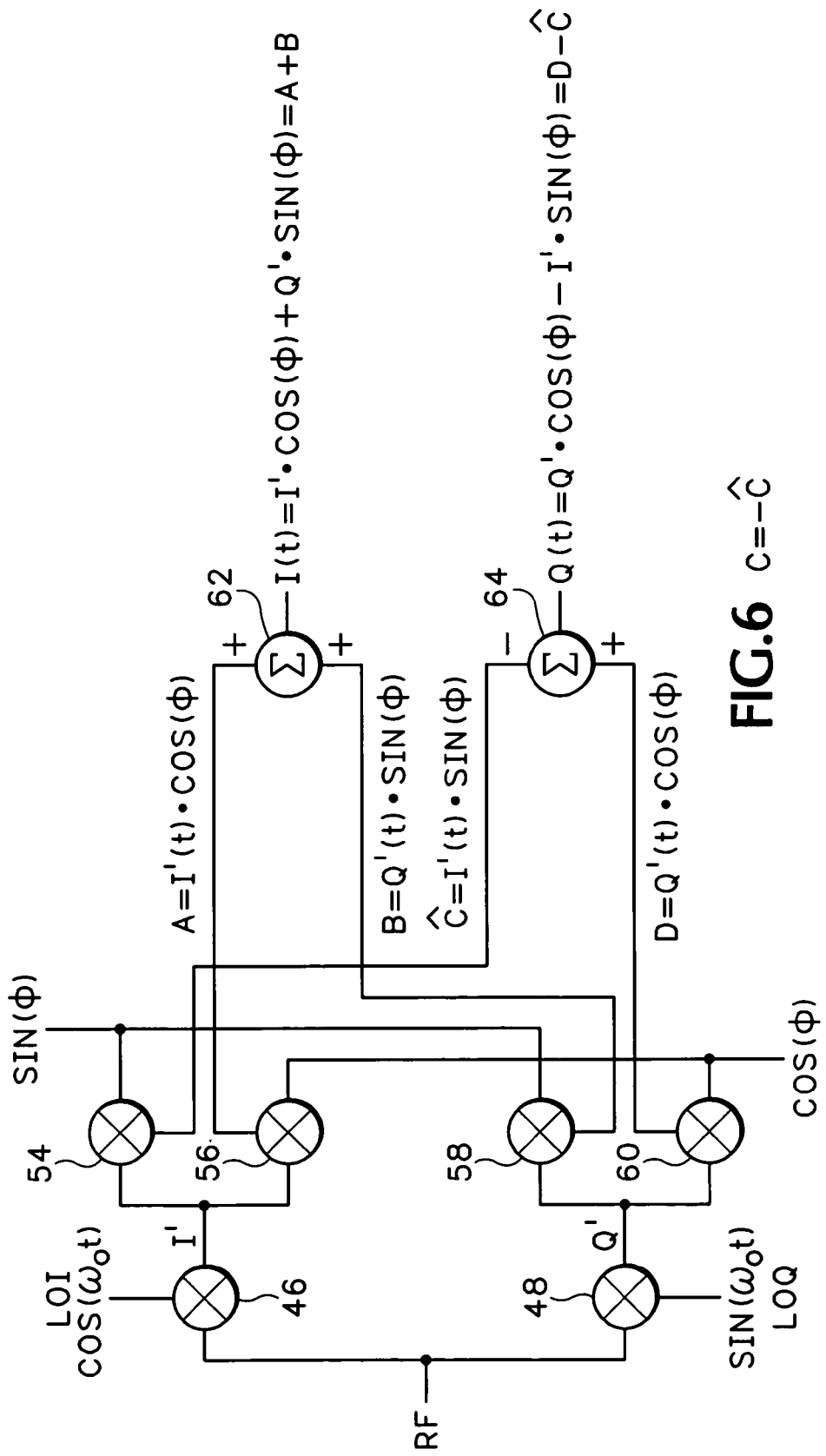
FIG. 6 illustrates an embodiment of a technique for providing phase shift in a single channel I/Q demodulator according to the inventive principles of this patent disclosure.

FIG. 6 illustrates an embodiment of a technique for providing phase shift in a single channel I/Q demodulator. The embodiment of FIG. 6 is an analog embodiment derived from a digital mechanization of a Fourier transform disclosed in *Radar System Design & Analysis*, S. A. Hovanessian, pp. 264-268, Artech House, 1984. The input signal is applied to I and Q mixers 46 and 48 which generate baseband signals I' and Q' by mixing the input signal with I and Q clock signals, respectively. Since the input signal is typically at a frequency that is much higher than the modulation signal, it will be referred to here as the RF signal. The I and Q clock signals are typically generated by a local oscillator (or master oscillator) operating at the same RF frequency and will be referred to as LOI and LOQ. The inventive principles, however, are not limited to systems having any particular clock sources, or that operate at any particular frequency.

Phase rotation of the I' and Q' signals is accomplished by mixers 54, 56, 58 and 60, and a pair of summing circuits 62 and 64. The mixers generate a group of four component signals by multiplying each of the I' and Q' signals by first and second phase select signals $\sin(\phi)$ and $\cos(\phi)$ which are scalars that weight signals I(t) and Q(t). The four component signals are then recombined by summing circuits 62 and 64 to generate the I(t) and Q(t) output signals which may then be filtered and further processed in any suitable manner.

Although the system of FIG. 6 performs the phase rotation (shifting) operation at baseband, it may require a complex arrangement of analog mixers. Note that a complete system may be required for each channel in a beamforming system.

Figure 7:
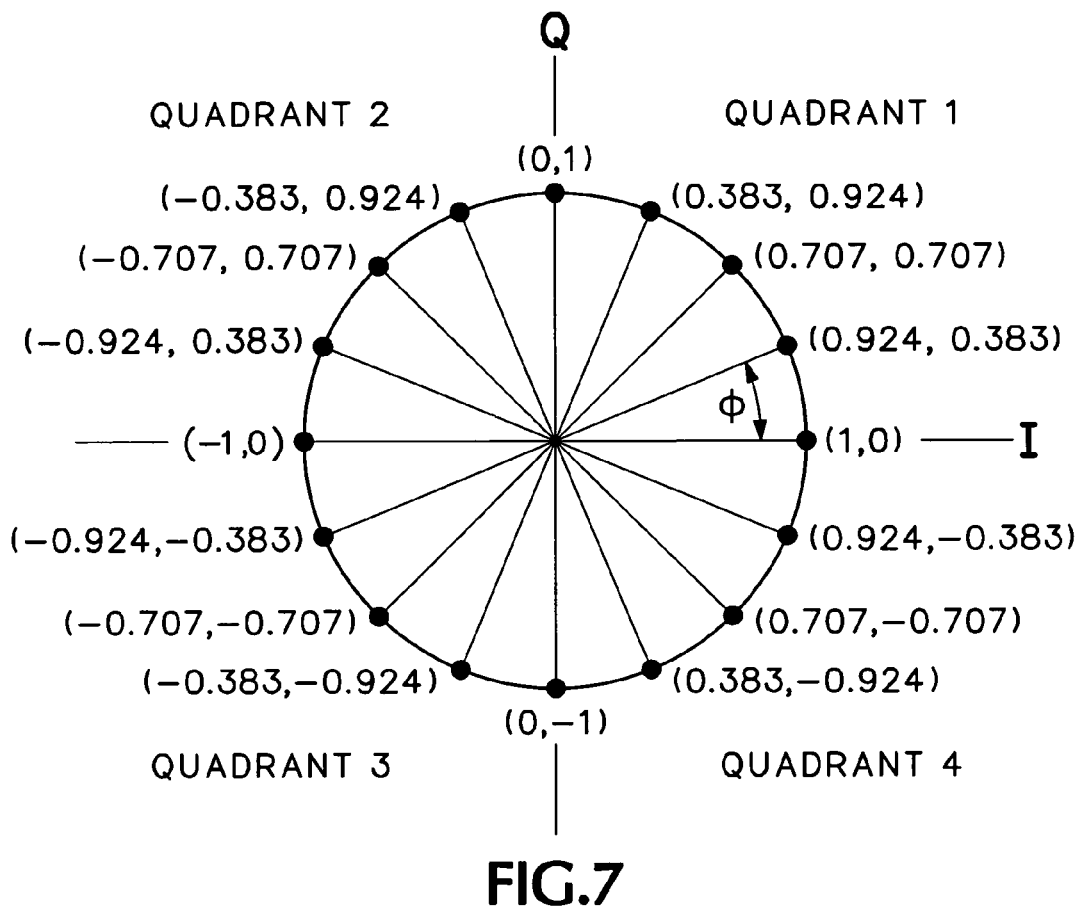
FIG. 7 is a phasor diagram of discrete phase rotation values.

In many applications, continuous phase rotation is not required. That is, the phase rotation may be implemented in discrete steps. For example, in continuous wave (CW) Doppler ultrasound for medical imaging, adequate beamforming capability may be obtained by dividing the 360° ($2\pi$ radians) of possible phase rotation into eight or sixteen discrete phase shifts; 45° and 22.5° each, respectively. In this case, the complex mixer arrangement may be simplified into a simpler arrangement in which I' and Q' are weighted by predetermined values since the phase select signals $\sin(\phi)$ and $\cos(\phi)$ only take on the discrete values shown in the phasor diagram in FIG. 7.

Figure 8:
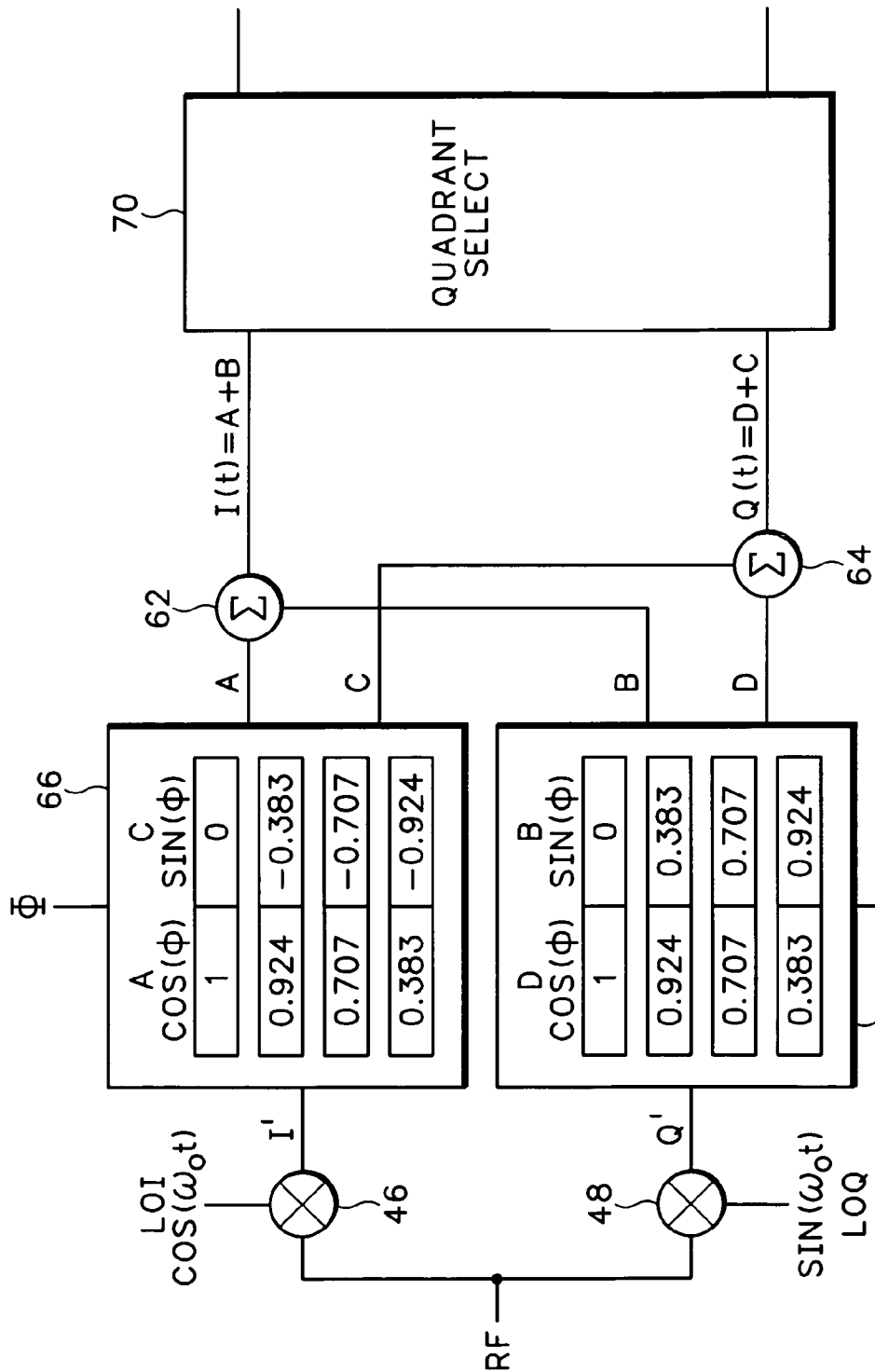
FIG. 8 illustrates an embodiment of a system for providing phase shift in discrete steps in a quadrature demodulation system according to the inventive principles of this patent disclosure.

FIG. 8 illustrates an embodiment of a system for providing phase shift in discrete steps in a quadrature demodulation system according to the inventive principles of this patent disclosure. The embodiment of FIG. 8 includes I and Q mixers 46 and 48 which mix the RF signal with the I and Q clock signals LOI and LOQ to generate the I' and Q' signals. Rather than an array of additional mixers, however, the embodiment of FIG. 8 includes phase rotators 66 and 68 which generate a series of component signals by multiplying each of the I' and Q' signals by pairs of weighting scalars which in this case are sine and cosine values for the appropriate phase angle $\phi$ shown in FIG. 8. A phase select signal, shown generically as (I), (and which may be a collection of one or more digital decoding signals) determines which weighting functions are applied. Note that "C" in FIG. 8 incorporates the minus sign before the summer in FIG. 6, therefore the equation for Q(t) =D+C in FIG. 8 compared to D−Ĉ in FIG. 6.

The weighted component signals may then be recombined by summing circuits 62 and 64 to generate the I(t) and Q(t) output signals which may then be filtered and further processed in any suitable manner, or to further simplify the embodiment of FIG. 8, a quadrant select circuit 70 may be included to reduce the number of weighting values in each of the phase rotators. To understand how quadrant selection may simplify the system, reference is made to the phasor diagram of FIG. 7. All of the magnitudes of weighting values are present in the first quadrant (Quadrant 1) of FIG. 7. The remaining values may be obtained by inverting (multiplying by −1) and/or swapping I and Q signals. The quadrant select circuit 70 performs the inversion and/or swapping functions in response to all or a portion of the phase select signal Φ.

In a practical realization, the LOI and LOQ signals are generated by a divider that is driven by a reference clock that operates, e.g., at four times the frequency of the LOI and LOQ signals. Also in a practical realization, the quadrant select circuit includes a reset input (preferably made available as an external chip input) that may be used to ensure correct phase rotation at power-up or during a reset event. For example, if the system of FIG. 8 is used to implement multiple demodulator channels in a beamforming system, the LO divider may power up or reset shifted 180 degree in one channel versus 0 degrees in another. Thus, a 45 degree phase shift may end up as a 45+180=225 degree phase shift. A reset input may be used to eliminate such problems.

Figure 9:
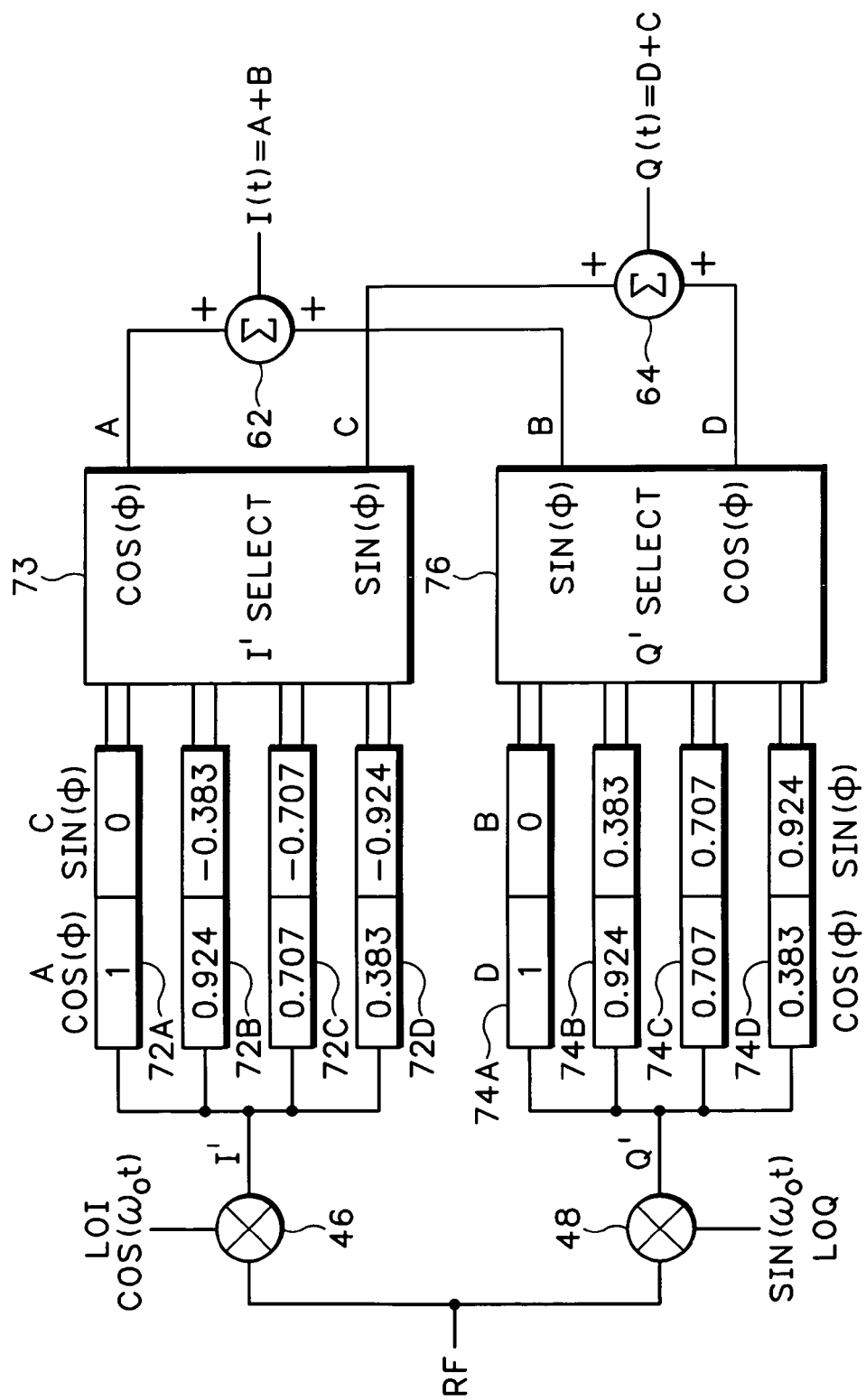
FIG. 9 illustrates an additional embodiment of a system for providing phase shift in discrete steps according to the inventive principles of this patent disclosure.
Figure 10:
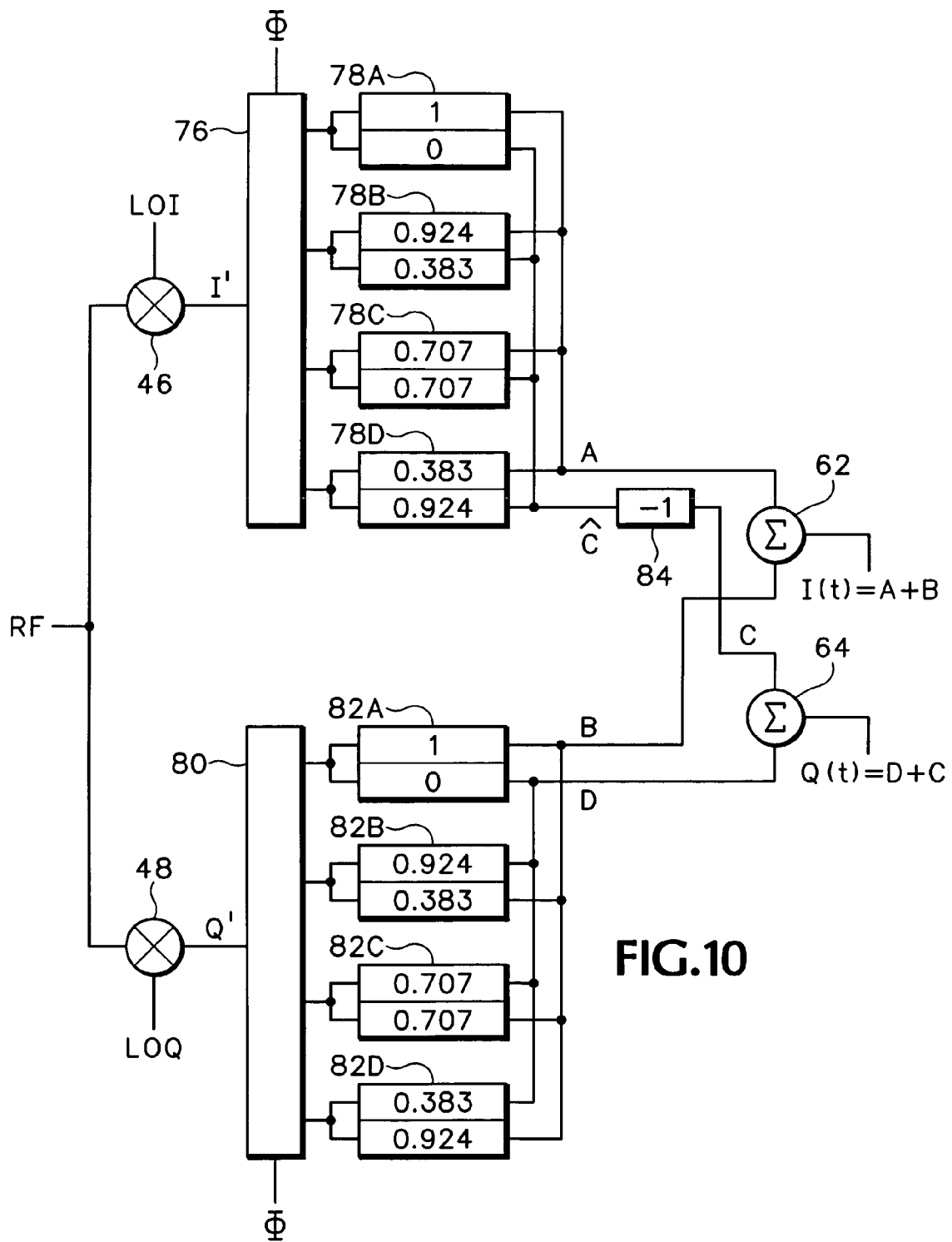
FIG. 10 illustrates another embodiment of a system for providing phase shift in discrete steps according to the inventive principles of this patent disclosure.

FIGS. 9 and 10 illustrate additional embodiments of systems for providing phase shift in discrete steps according to the inventive principles of this patent disclosure. The embodiments of FIGS. 9 and 10 illustrate two different approaches to implementing the phase rotators of FIG. 8. In the embodiment of FIG. 9, a first set of weighting circuit pairs 72A-D generate four pairs of sine/cosine weighted component signal pairs by multiplying the I' signal by the sine and cosine values of 22.5, 45, 67.5 and 90 degrees. Select circuit 73 passes a selected pair of signals through to summing circuits 62 and 64.

On the Q side of the system, a second set of weighting circuit pairs 74A-D and a second select circuit 76 generate a series of sine/cosine weighed component signal pairs from the Q' signal. The outputs from the second select circuit are applied to the summing circuits 62 and 64 which, together with the weighted signals from the I side of the system generate the I(t) and Q(t) signals. For any desired phase rotation, the select circuits select the signal pairs from corresponding pairs of weighting circuits on the I and Q sides of the system. That is, the outputs from weighting circuit pair 72A are selected at the same time as the outputs from weighting circuit pair 74A. A quadrant select circuit may then be used to invert and/or swap I and Q signals to obtain the final output signals to obtain full four-quadrant operation.

The embodiment of FIG. 10 essentially reverses the order of the weighting and select circuits. Here, the first select circuit 76 selectively passes the I' signal to one of the first set of weighting circuit pairs 78A-D. Likewise, the second select circuit 80 selectively passes the Q' signal to one of the second set of weighting circuit pairs 82A-D. This may effectively enable only the relevant pair of weighting circuits in each phase rotator. The outputs of the weighting circuits are connected in parallel to the summing circuits 62 and 64. An inverter 84 provides the proper negative sign for the I' $\sin(\phi)$ signal needed in the generation of the Q(t) output signal. Again, a quadrant select circuit may then be used to invert and/or swap I and Q signals to obtain the final output signals to obtain full four-quadrant operation.

Current Mirror Weighting Circuits

Figure 11:
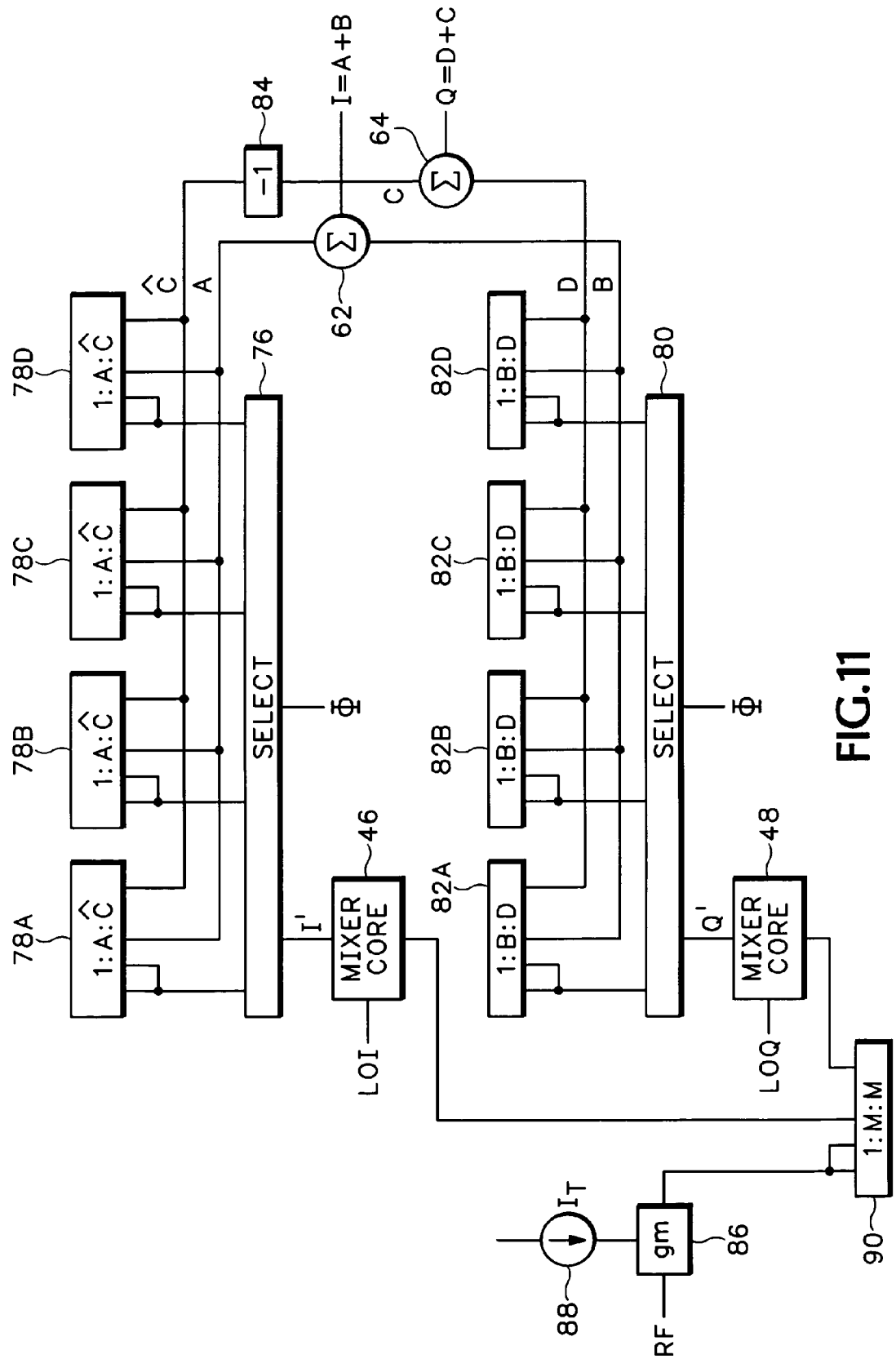
FIG. 11 illustrates an embodiment of one possible circuit implementation of the system of FIG. 10 according to the inventive principles of this patent disclosure.

FIG. 11 illustrates an embodiment of a circuit implementation of the system of FIG. 10 according to the inventive principles of this patent disclosure. A transconductance (gm) cell 86 converts the input signal RF to a current mode signal which is applied to the input of a dual-output current mirror 90. One output drives the I side of the system, while the other drives the Q side. The current mirror is shown having a current ratio of 1:M:M meaning each of the output currents is M times the input current. Any suitable value of current ratio may be used, just as any suitable bias (or "tail") current $I_T$ may be used to bias the gm cell. Mixer core 46 mixes the current mode reflection of the input signal with the I (in-phase) local oscillator signal LOI to generate the I' signal.

Select circuit 76 steers the I' signal to one of four dual-output current mirrors 78A-D each of which has a current ratio of 1:A:Ĉ. On the other side of the system, select circuit 80 steers the Q' signal to one of four dual-output current mirrors 82A-D each of which has a current ratio of 1:B:D. The values of A, B, Ĉ and D for the current mirrors are selected to provide the proper weighting based on the selected amount of phase rotation. Thus, the embodiment of FIG. 11 uses ratioed current mirrors to implement the weighting functions.

The current mirror outputs, which are the weighted component signals, are summed by summing circuits 62 and 64. An inverter 84 is used on the C component signals to provide the correct polarity for C going into the summing circuit that generates the Q(t) signal. The outputs from the summing circuits are the I(t) and Q(t) signals which may then be quadrant selected, filtered, and/or further processed as may be needed.

Figure 12A:
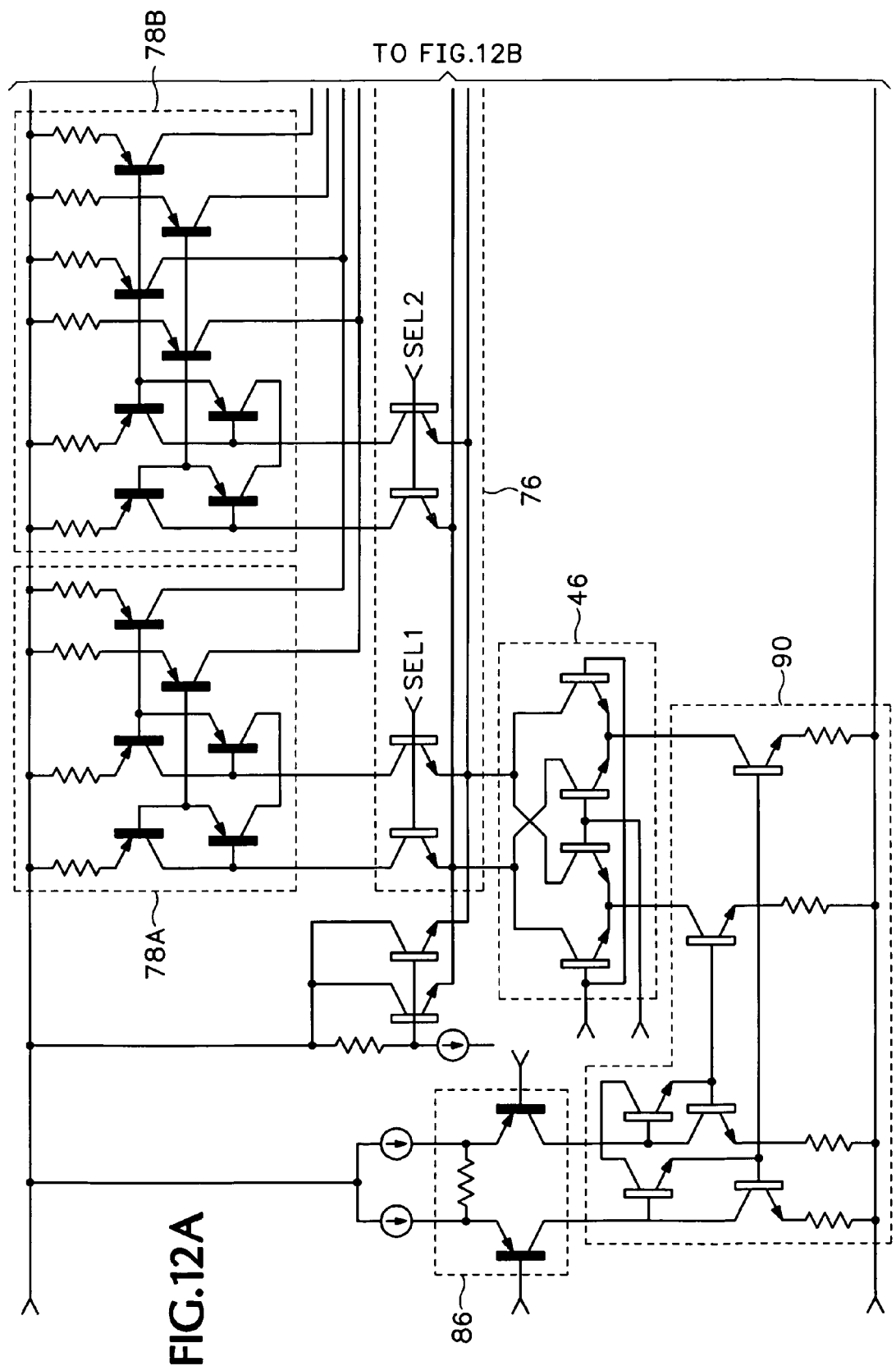
FIG. 12 illustrates a fully differential embodiment of a circuit implementation of a system for providing phase shift according to the inventive principles of this patent disclosure.
Figure 12B:
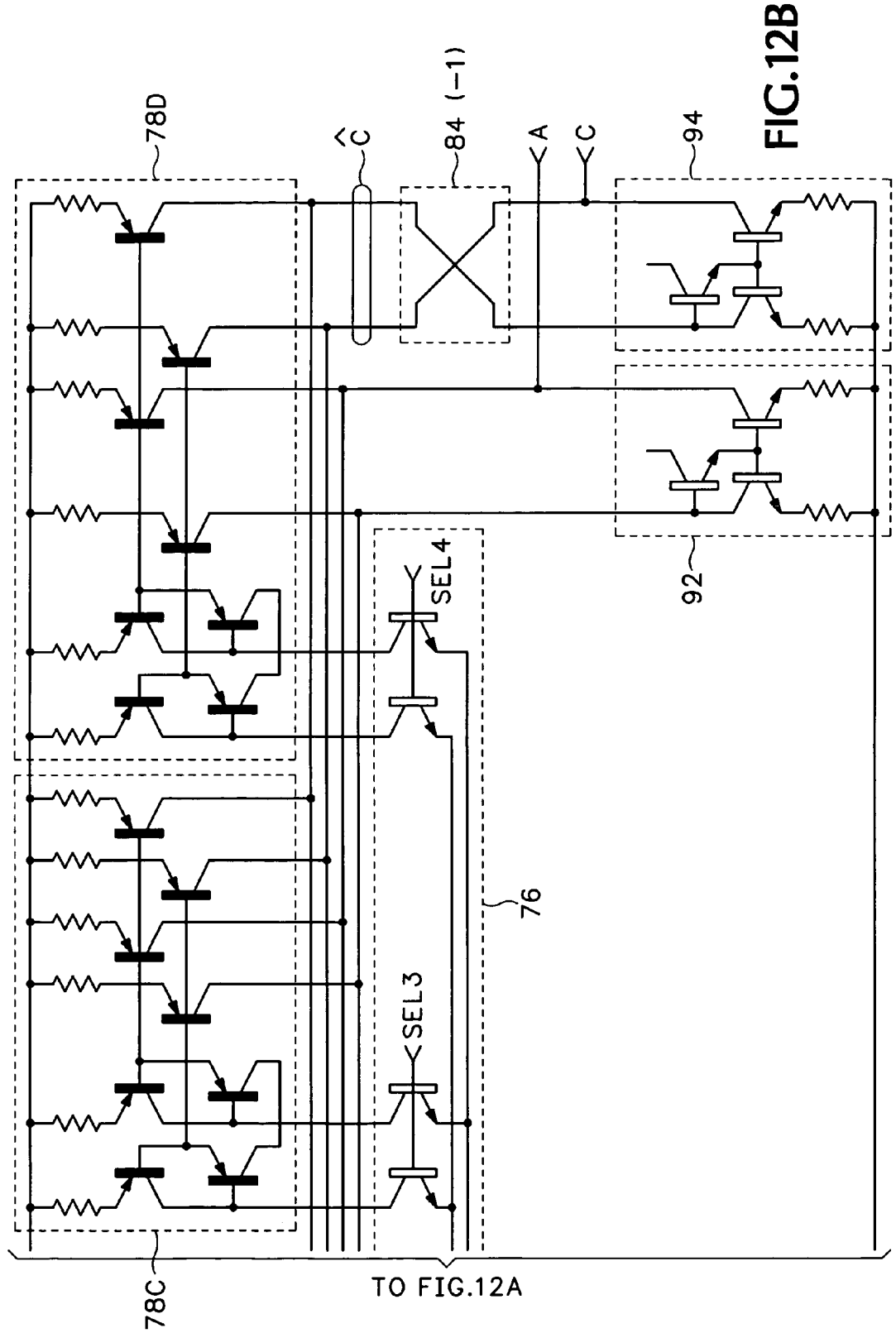

For simplicity, the embodiment of FIG. 11 is shown as a single-ended implementation. FIG. 12 illustrates some possible implementation details for a fully differential embodiment. Only the I side of the system is shown. The Q side would have essentially the same structure except for the inversion indicated at 84. The select circuit 76 is realized as a series of cascode transistors that route the I' signal to the appropriate current mirrors in response to the phase select signals SEL1-4. Current mirrors 92 and 94 convert the final A and C component signals to single-ended form. Because the output signals are current mode, the summing circuits may be implemented tying the outputs together. The differential structure allows the inverter 84 to be implemented by simply switching inputs to the C current mirror 94. To implement the "times 0" weight, one output of current mirror 78A is simply omitted.

Figure 13:
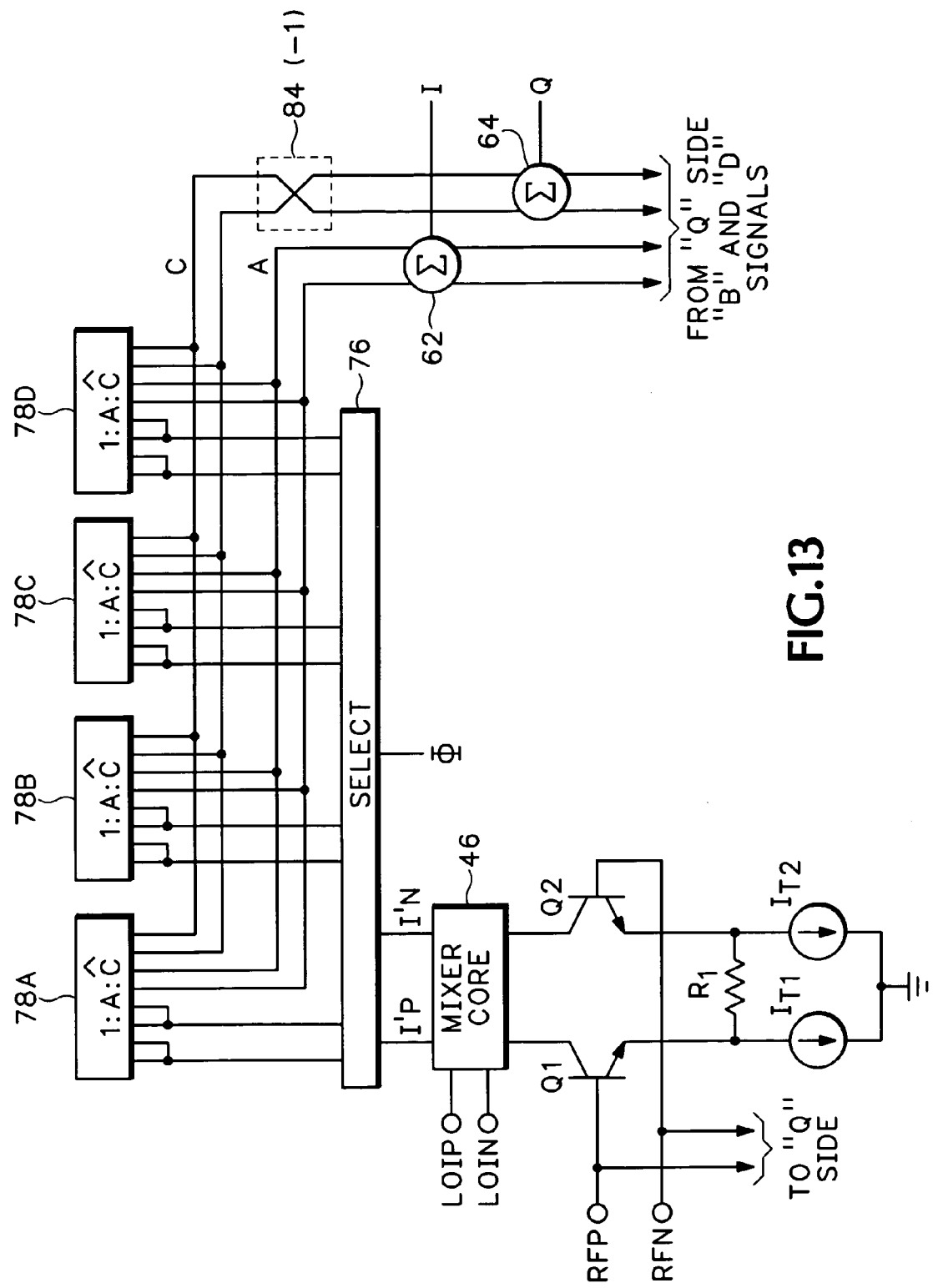
FIG. 13 illustrates an alternative embodiment of a system for providing phase shift in discrete steps according to the inventive principles of this patent disclosure.

FIG. 13 illustrates an alternative embodiment of a system for providing phase shift in discrete steps according to the inventive principles of this patent disclosure. The embodiment of FIG. 13 eliminates the current mirror (1:M:M) and thereby reduces power and noise. This simplified input signal path may result in reduced noise at the input, albeit, at the possible expense of power supply headroom. Only the I side of the system is shown. The Q side would have essentially the same structure.

Demodulator With Stacked Mixers

Figure 14:
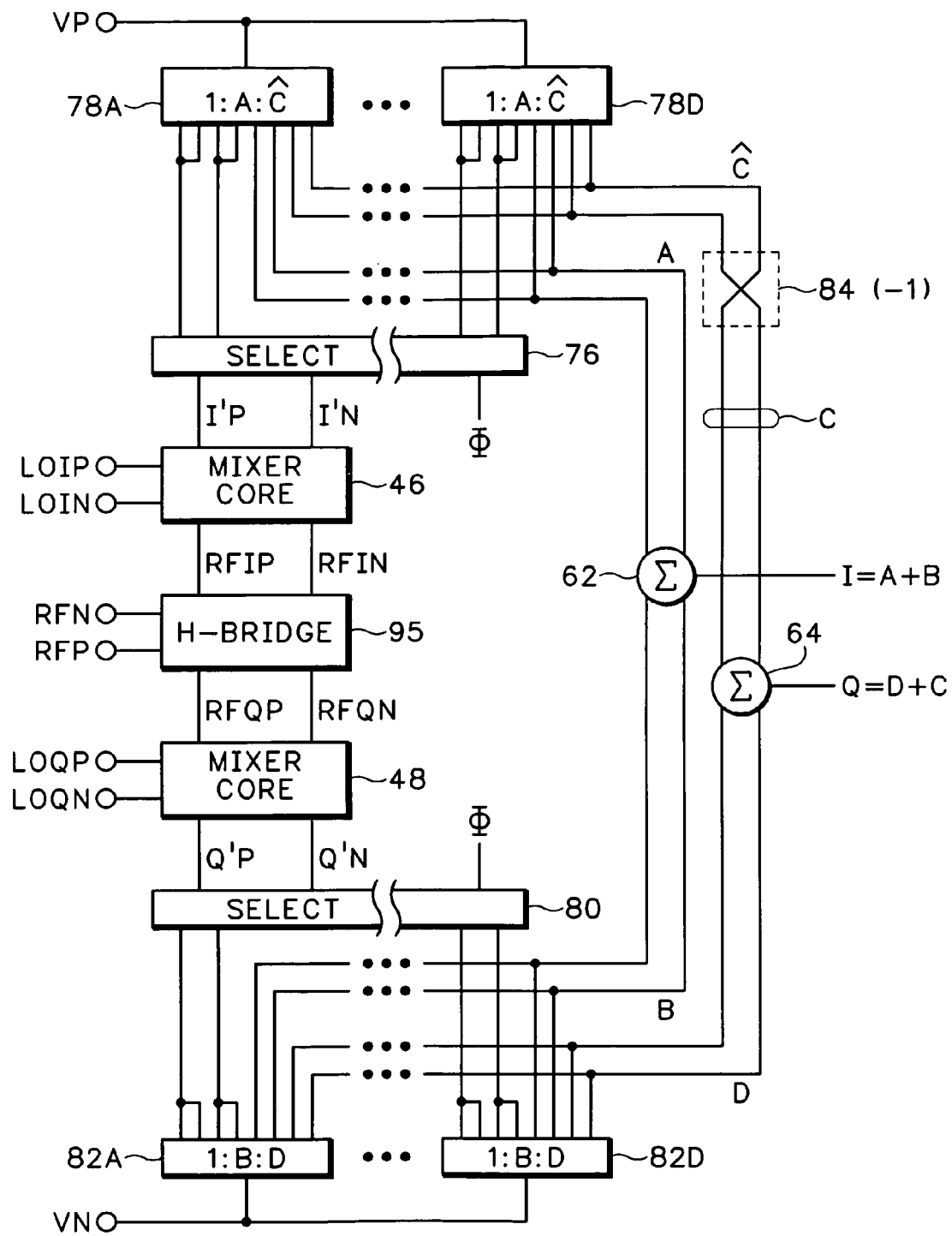
FIG. 14 illustrates an embodiment of a system for providing phase shift in a quadrature demodulator according to the inventive principles of this patent disclosure.
Figure 14A:
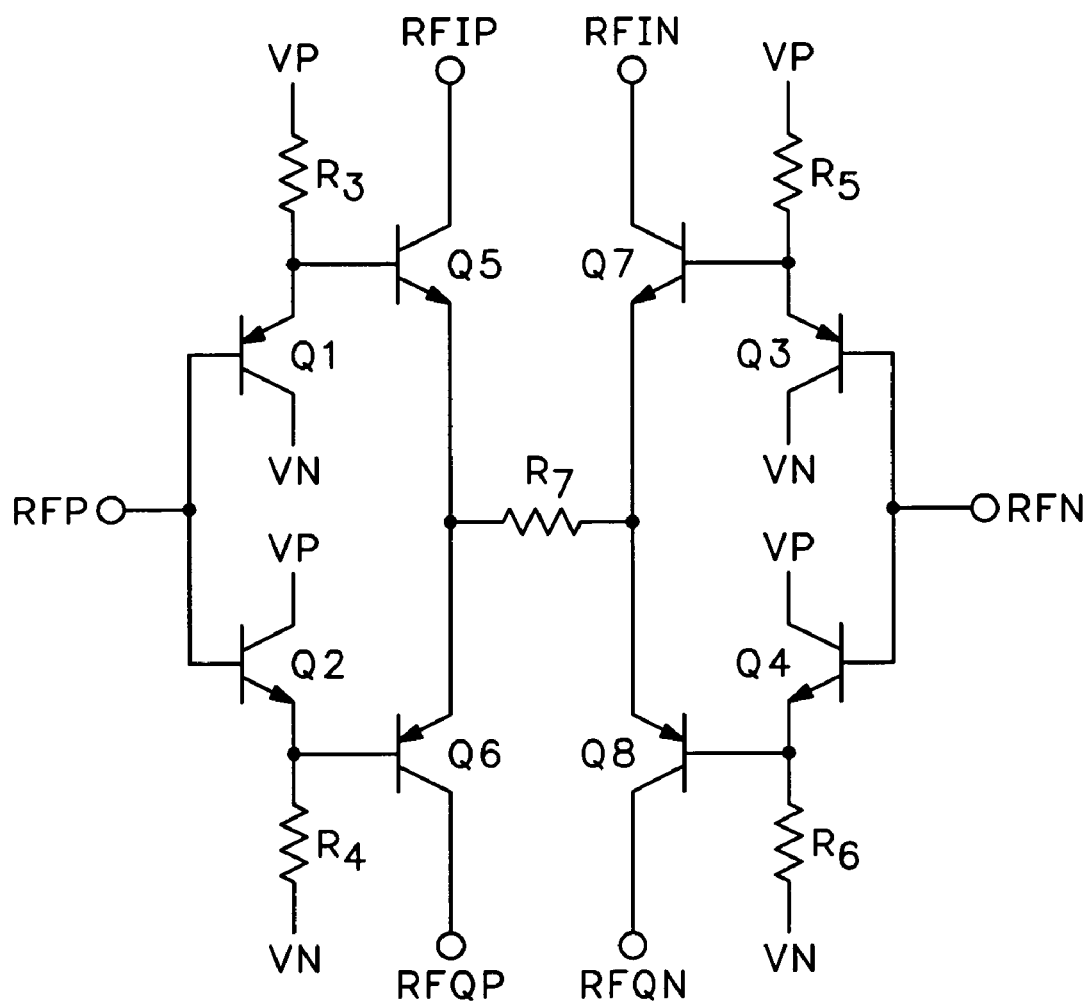

FIG. 14 illustrates an embodiment of a system for providing phase shift in a quadrature demodulator according to the inventive principles of this patent disclosure. The embodiment of FIG. 14 employs a "stacked" structure of mixers. That is, the mixer cores 46 and 48 are arranged in series between the power supplies. An H-bridge 95 (which implements a gm stage) is arranged between the mixer cores and is utilized as the input stage to provide tightly integrated, fully differential voltage-to-current conversion of the input signal. An example of a suitable H-bridge circuit is illustrated in FIG. 14A. The select circuit 80, mixer core 48, and weighting circuits 82A-D on the Q side of the system may be implemented with opposite polarity to those on the I side of the system so that the entire system of input stage, mixer cores, select circuits and weighting circuits may be arranged in a stacked configuration. Although the phase rotators are shown here as discrete, selected weighting circuits, the stacked mixer core principles are not limited to use with any particular type of input stage or technique for phase rotation.

Integrated Mixers and Select Circuits

Figure 15:
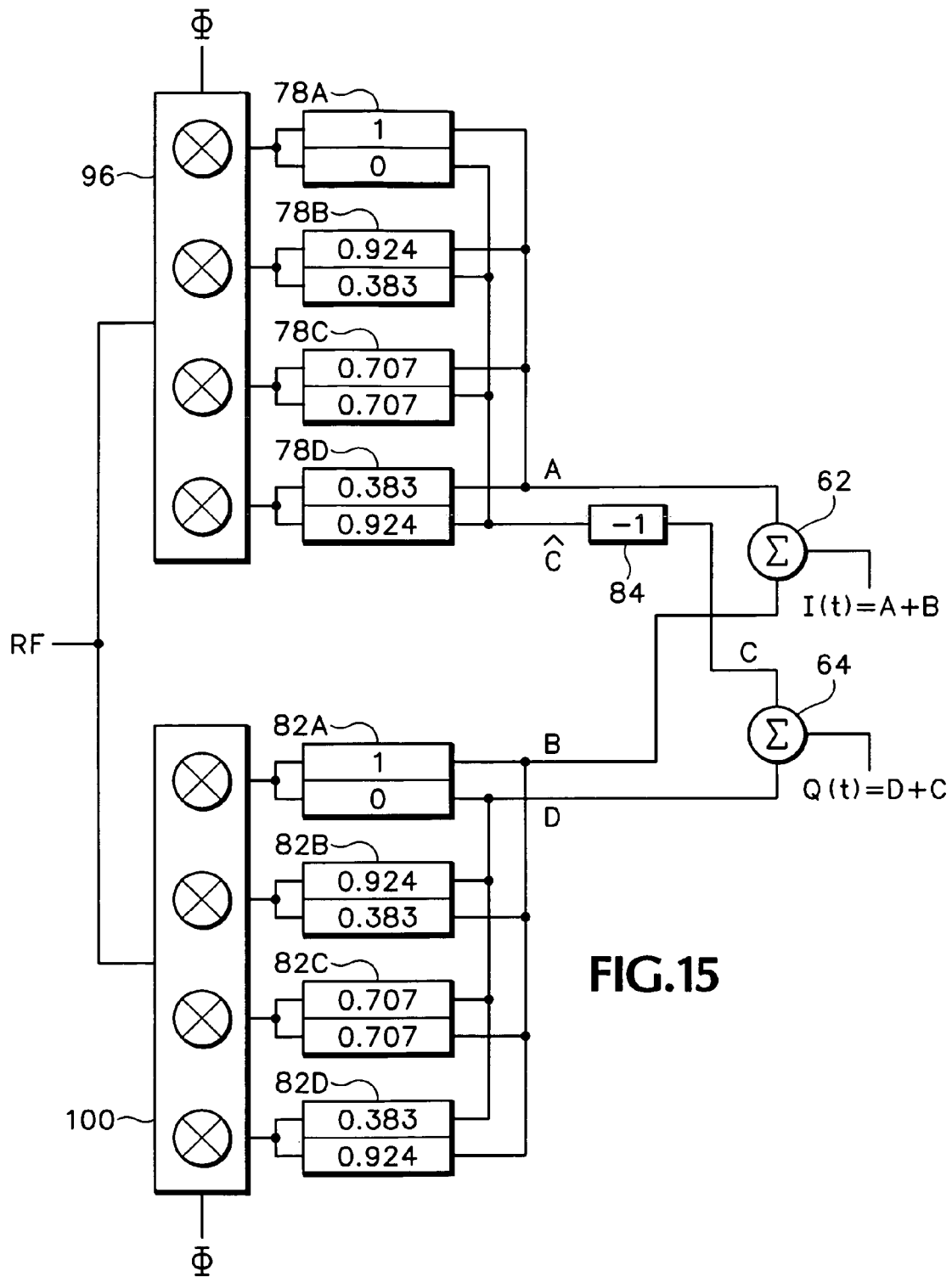
FIG. 15 illustrates an embodiment of a system for providing discrete phase shift in a quadrature demodulator according to the inventive principles of this patent disclosure.

FIG. 15 illustrates an embodiment of a system for providing discrete phase shift in a quadrature demodulator according to the inventive principles of this patent disclosure. In the embodiment of FIG. 15, the mixing and phase selection functions are combined in a single circuit. On the I side of the system, a first mixer/selector circuit 96 includes a set of mixers 98A-D that can be selectively enabled in response to a phase select signal Φ. Any selected mixer combines the RF input signal with the LOI signal and directs the resulting signal to one of the weighting circuit pairs 78A-D. On the Q side, a second mixer/selector circuit 100 includes a second set of mixers 102A-D that perform a similar mixing and selection operation. The component signal outputs from the weighting circuits may then be recombined, quadrant selected, and/or further processed in any suitable manner such as that described with reference to FIG. 10.

Figure 16:
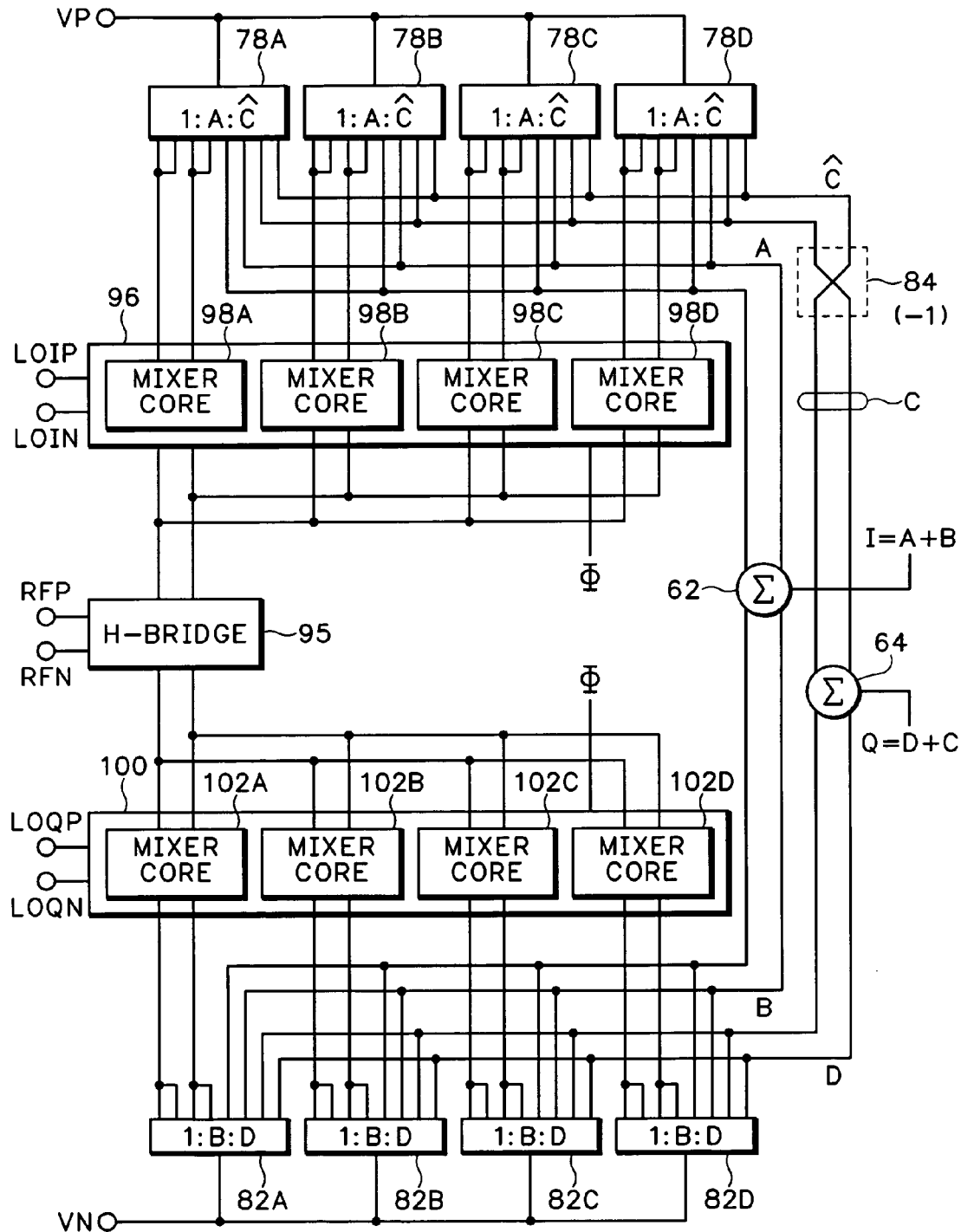
FIG. 16 illustrates another embodiment showing some example implementation details of a system according to the inventive principles of this patent disclosure.

FIG. 16 illustrates another embodiment showing some example implementation details of a system according to the inventive principles of this patent disclosure. The embodiment of FIG. 16 combines the principles of integrated mixer/selector circuits with the principles of stacked mixer cores described above. An H-bridge 95 converts a differential voltage input signal to differential current mode signals that drive the paralleled inputs of mixer cores 98A-D and 102A-D that are stacked with the H-bridge. The mixer cores in the I side of the system are enabled in response to the phase select signal Φ by selectively applying the LOI signal to the mixer cores. This, in turn, selects which of the weighting circuit pairs 78A-D (shown here as dual-output current mirrors) receives the output signal from a selected mixer. This arrangement may provide a tightly arranged input that reduces noise, while eliminating the power supply headroom penalty that may result from having the select circuits (cascodes) separate from the mixers.

Pre-Weighted Input to Mixers

Figure 17:
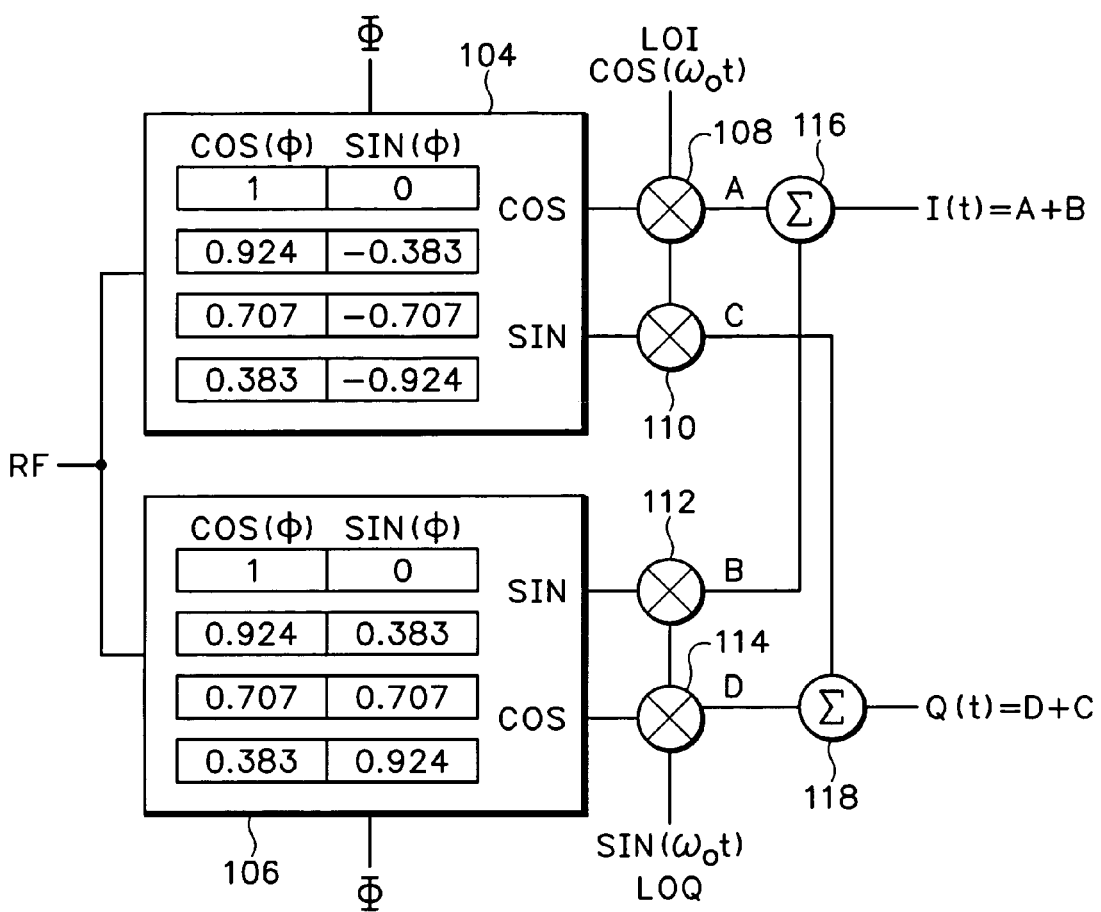
FIG. 17 illustrates another embodiment of a demodulation system having phase rotation according to the inventive principles of this patent disclosure.

FIG. 17 illustrates another embodiment of a demodulation system having phase rotation according to the inventive principles of this patent disclosure. The embodiment of FIG. 17 places phase rotators 104 and 106 upstream from the mixers so that the mixer inputs are preweighted. The I side phase rotator 104 generates a pair of weighted signals by multiplying the RF input signal by selected pairs of weighting scalars, which in this case are sine and cosine functions. A phase select signal, shown generically as Φ, (and which may be a collection of one or more digital decoding signals) determines which weighting is applied. Each of the weighted signals is then mixed with the in-phase local oscillator signal LOI by a corresponding one of mixers 108 and 110 to generate A and C component signals.

The Q side phase rotator 106 has a similar structure and generates another selected pair of weighted signals which are then mixed with the quadrature local oscillator signal LOQ by corresponding mixers 112 and 114 to generate B and D component signals. A pair of summing circuits 116 and 118 recombine the component signals to generate the I(t) and Q(t) output signals which may then be quadrant selected, filtered and/or further processed in any suitable manner.

Figure 18:
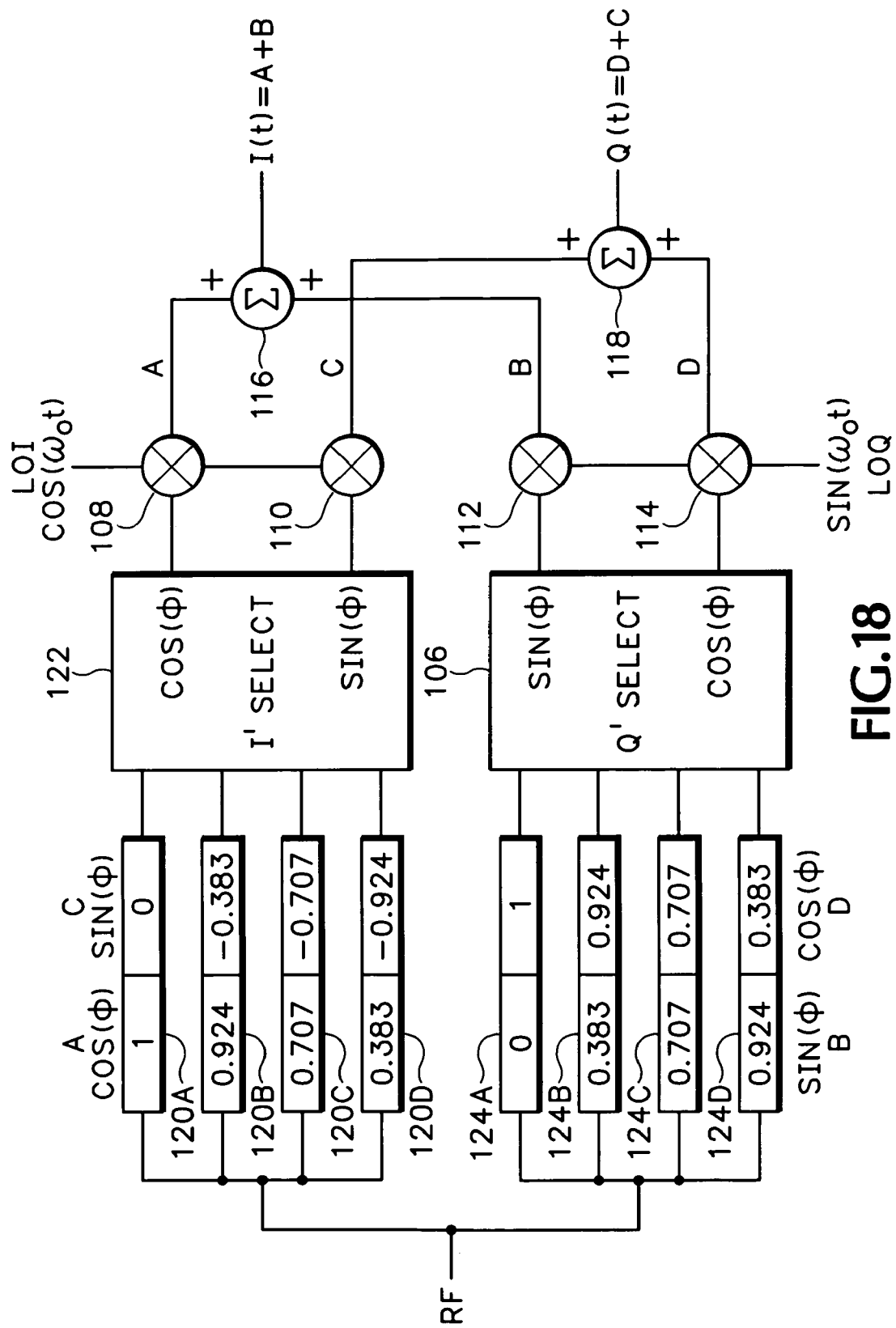
FIG. 18 illustrates one possible approach to implementing the demodulation system of FIG. 17 according to the inventive principles of this patent disclosure.

FIG. 18 illustrates one possible approach to implementing the demodulation system of FIG. 17 according to the inventive principles of this patent disclosure. In the embodiment of FIG. 18, the I side phase rotator 104 is realized as a set of weighting circuit pairs 120A-D and a select circuit 122 which selects the outputs from one of the weighting circuit pairs in response to the phase select signal Φ. The Q side phase rotator 106 has a similar structure and provides weighted RF inputs to mixers 112 and 114 which receive the LOQ signal.

Although the embodiments of FIGS. 8 and 9 may appear to provide the same results as the embodiments of FIGS. 17 and 18 in the abstract mathematical sense, the arrangement of components may have important ramifications for the real world performance of an actual circuit implementation. For example, the embodiment illustrated in FIG. 11 may be seen as a "direct" implementation of the system of FIG. 8. It has certain operating characteristics such as noise levels, power consumption, power supply headroom, etc., that may be inherently constrained by the arrangement of components. These constraints may be quite different from those relating to implementations of the embodiments of FIGS. 17 and 18, an example of which is described with reference to FIG. 19.

Figure 19A:
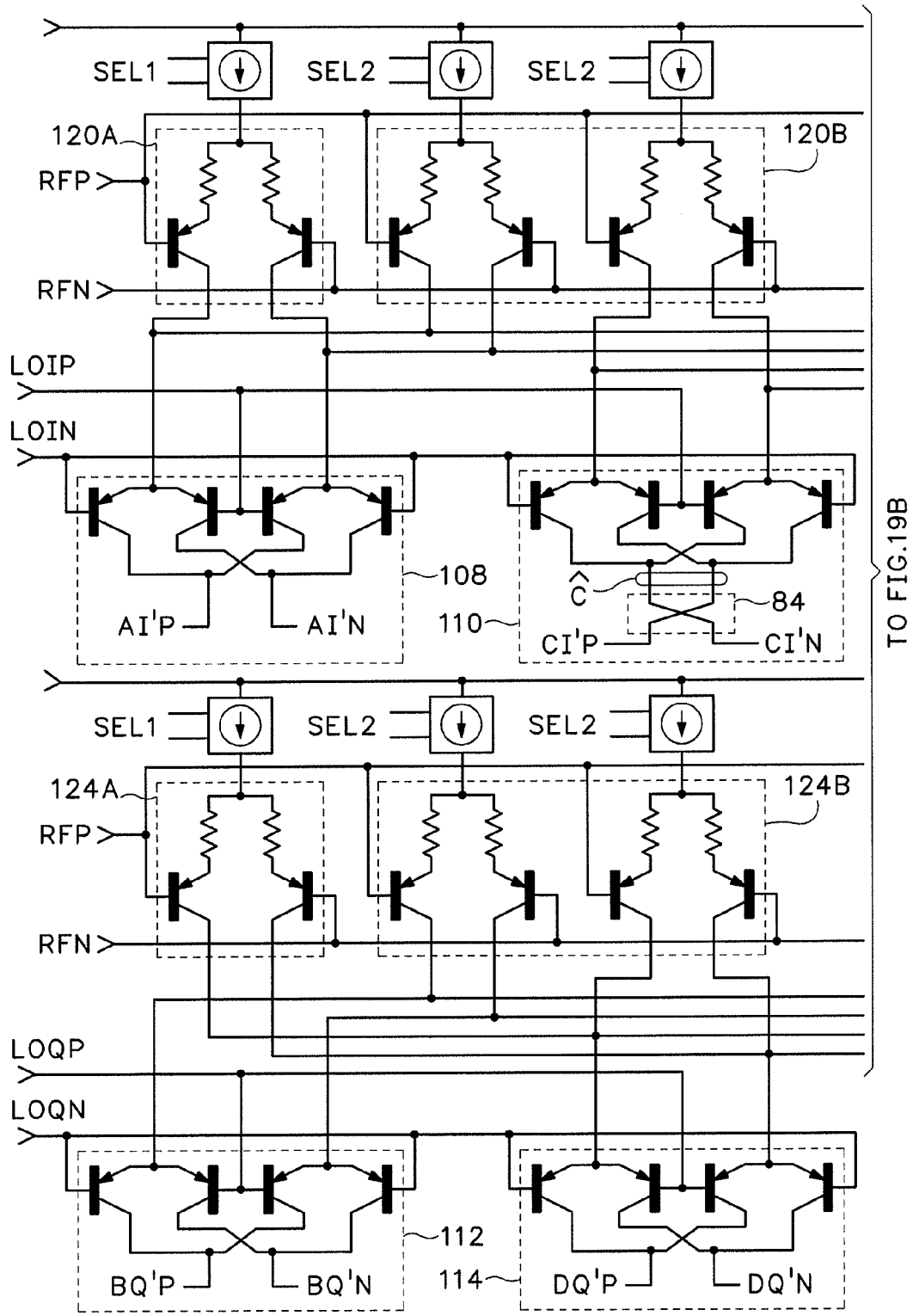
FIG. 19 illustrates another approach to implementing the demodulation system of FIG. 17 according to the inventive principles of this patent disclosure.
Figure 19B:
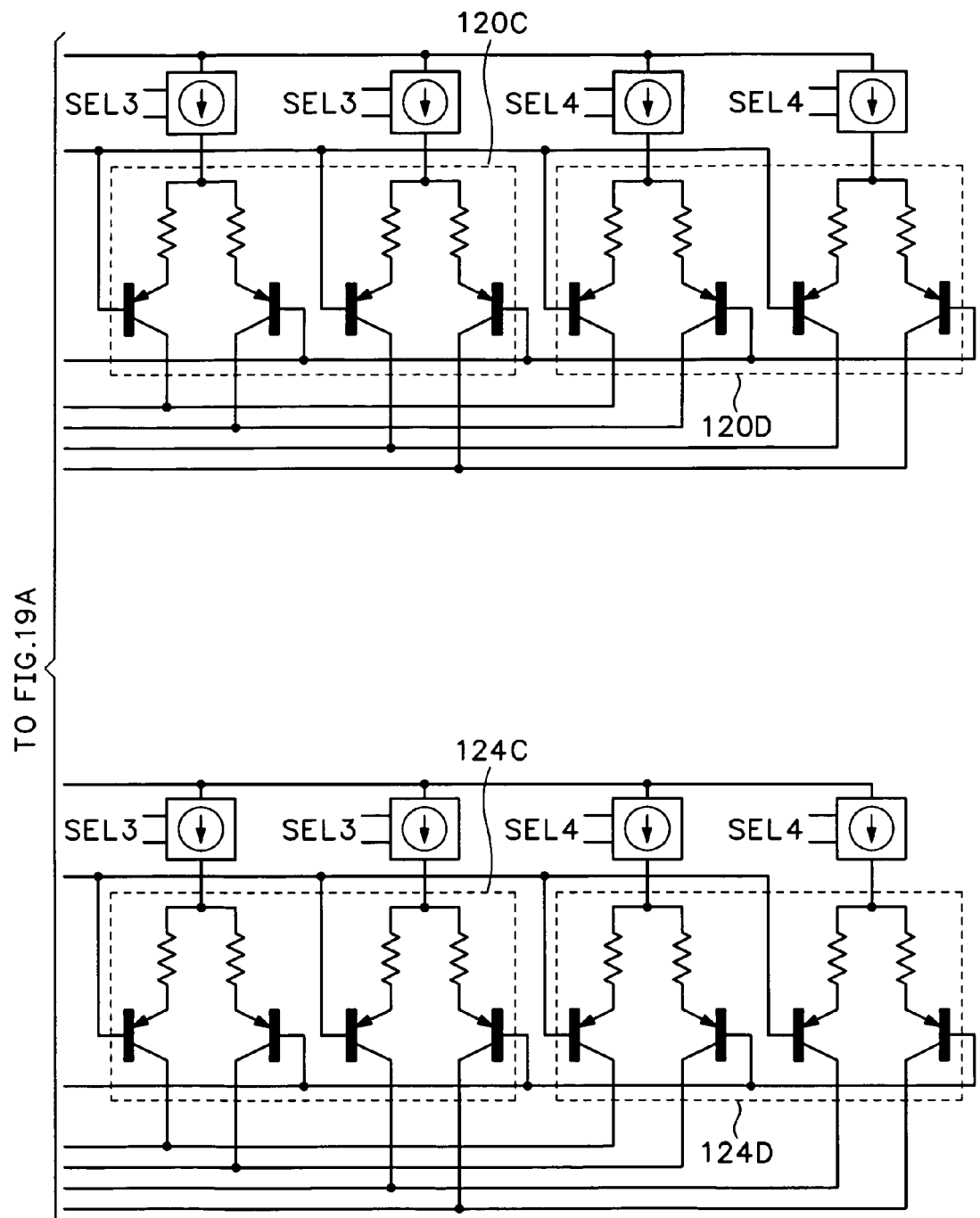

FIG. 19 illustrates another approach to implementing the demodulation system of FIG. 17 according to the inventive principles of this patent disclosure. In the embodiment of FIG. 19, the weighting circuits 120A-D and 124A-D are implemented as transconductance (gm) cells having bias currents and degeneration resistors that are sized to provide the requisite amount of gain so as to weight the RF input signal appropriately. The outputs from the cosine weighted gm cells on the I side are connected in parallel to one input of mixer core 108 which generates the A component signal by mixing the weighted RF input with the LOI signal. The outputs from the sine weighted gm cells are connected in parallel to one input of mixer core 110 which generates the C component signal. A weight of "zero" is achieved by simply omitting the gm cell. Note that the C component signal is inverted (−1) by swapping the IF outputs (Ĉ) of the mixer cores at 84. A gm cell is selected by enabling its corresponding bias current source in response to one of the phase select signals SEL1 through SEL4. Thus, the select function is integrated into the weighting circuits. Alternatively, a series of cascode transistors may be interposed between the gm cells and the mixers. The Q side of the system has a similar arrangement that generates the B and D component signals in response to the LOQ signal. Because the component signals are in current mode, the summing circuits 116 and 118 may be implemented as simple summing nodes (FIG. 20).

Figure 20:
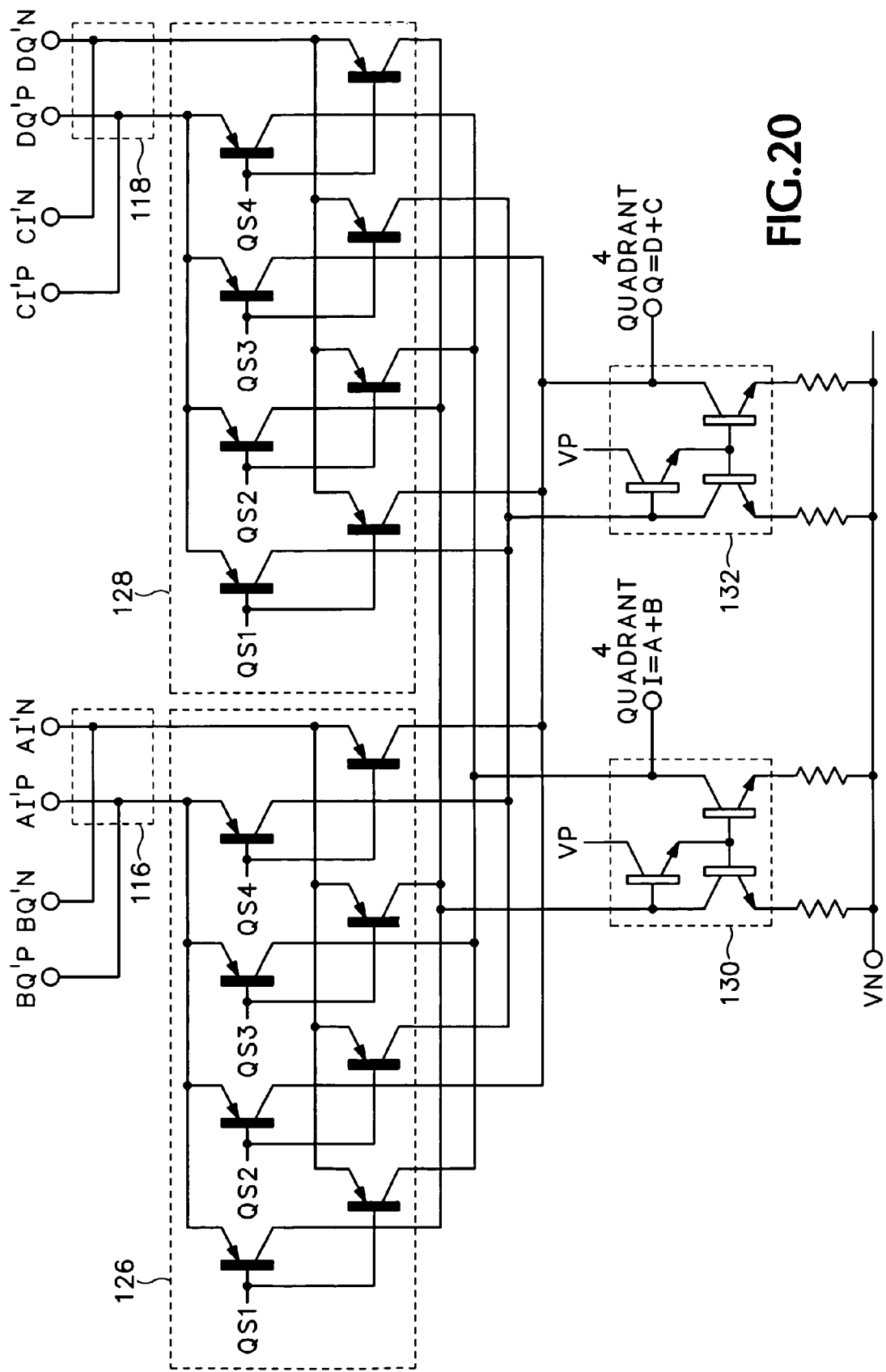
FIG. 20 illustrates an embodiment of a quadrant select circuit according to the inventive principles of this patent disclosure.

The A, B, C and D component signals, which in this example are differential current mode signals, may be applied to a quadrant select circuit such as that illustrated in FIG. 20. Two banks of switched cascode transistors 126 and 128 select the appropriate pairs of component signals in response to quadrant select signals QS1-4. The selected signal pairs are passed through to I and Q side current mirrors 130 and 132, respectively, which convert the differential currents into single-ended I(t) and Q(t) signals.

The embodiments of FIGS. 19 and 20 may provide a beneficial tradeoff of dynamic range and power consumption, especially when used in beamforming systems for CW Doppler ultrasound and radar. Since only a few of the input gm cells may be selected at any given time, power consumption may be reduced. Also, the arrangement of gm cells provides a tightly coupled input stage that may extend the dynamic range by lowering the noise floor. The overlapping operation of the gm cells and mixers on the I and Q sides may reduce the amount of power supply headroom required by the system.

The principles disclosed above can be realized in countless different embodiments. Only the preferred embodiments have been described. Although some specific details are shown for purposes of illustrating the preferred embodiments, other equally effective arrangements can be devised in accordance with the inventive principles of this patent disclosure. For example, some transistors have been illustrated as bipolar junction transistors (BJTs), but CMOS and other types of devices may be used as well. Likewise, some signals and mathematical values have been illustrated as voltages or currents, but the inventive principles of this patent disclosure are not limited to these particular signal modes. In the examples above embodiments having 16 discrete phase steps are illustrated, but the inventive principles may be applied to systems having a different number of steps. Since the embodiments described above can be modified in arrangement and detail without departing from the inventive concepts, such changes and modifications are considered to fall within the scope of the following claims.

The invention claimed is:

1. A quadrature demodulator comprising:
a first phase rotator to generate first and second weighted signals by weighting an input signal by a first scalar and a second scalar in response to a phase select signal;
a second phase rotator to generate third and fourth weighted signals by weighting the input signal by a third scalar and a fourth scalar in response to the phase select signal;
first and second mixers to generate first and second component signals by mixing the first and second weighted signals with an in-phase signal; and
third and fourth mixers to generate third and fourth component signals by mixing the third and fourth weighted signals with a quadrature signal;
where each phase rotator comprises a set of transconductance cells arranged to weight the input signal in response to the phase select signal; and
where:
the phase select signal comprises individual select signals;
the transconductance cells have different gains to provide different weights; and
the transconductance cells are arranged to be selectively enabled in response to the individual select signals.

* * * * *

UNITED STATES PATENT AND TRADEMARK OFFICE
CERTIFICATE OF CORRECTION

PATENT NO. : 7,760,833 B1  Page 1 of 1
APPLICATION NO. : 11/061366
DATED : July 20, 2010
INVENTOR(S) : Eberhard Brunner It is certified that error appears in the above-identified patent and that said Letters Patent is hereby corrected as shown below:

Column 5, Line 43, the letter "(I)" should be replaced with symbol --Φ--.

Signed and Sealed this
Twentieth Day of September, 2011

David J. Kappos
*Director of the United States Patent and Trademark Office*